(12) United States Patent
Kimes

(10) Patent No.: US 9,557,185 B2
(45) Date of Patent: Jan. 31, 2017

(54) SYSTEMS AND METHODS TO MODIFY DIRECTION OF TRAVEL AS A FUNCTION OF ACTION ITEMS

(71) Applicant: HomeAway, Inc., Austin, TX (US)

(72) Inventor: Juliette Susan Kimes, Dripping Springs, TX (US)

(73) Assignee: HomeAway, Inc., Austin, TX (US)

( * ) Notice: Subject to any disclaimer, the term of this patent is extended or adjusted under 35 U.S.C. 154(b) by 0 days.

(21) Appl. No.: 14/539,970

(22) Filed: Nov. 12, 2014

(65) Prior Publication Data

US 2016/0131490 A1    May 12, 2016

(51) Int. Cl.
G01C 21/34 (2006.01)
G01C 21/36 (2006.01)
H04W 4/02 (2009.01)

(52) U.S. Cl.
CPC ......... G01C 21/343 (2013.01); G01C 21/3415 (2013.01); G01C 21/3626 (2013.01); G01C 21/3667 (2013.01); H04W 4/02 (2013.01)

(58) Field of Classification Search
CPC .............. G01C 21/343; G01C 21/3667; G01C 21/3626; H04W 4/02
See application file for complete search history.

(56) References Cited

U.S. PATENT DOCUMENTS

| | | | |
|---|---|---|---|
| 7,813,950 B2 * | 10/2010 | Perrella ............ | G06Q 10/06311 705/7.16 |
| 8,694,791 B1 * | 4/2014 | Rohrweck ............... | G06F 21/36 455/418 |
| 9,223,494 B1 * | 12/2015 | DeSalvo ............... | G06F 3/0488 |
| 2002/0190726 A1 * | 12/2002 | Yankielun ................. | E02B 3/00 324/644 |
| 2003/0156097 A1 * | 8/2003 | Kakihara ........... | G01C 21/3688 345/156 |
| 2004/0054966 A1 * | 3/2004 | Busch .................... | G06Q 30/02 715/223 |
| 2005/0125148 A1 * | 6/2005 | Van Buer ........... | G01C 21/3617 701/468 |
| 2006/0173841 A1 * | 8/2006 | Bill .................... | G01C 21/3407 |
| 2008/0086455 A1 * | 4/2008 | Meisels .................. | G01C 21/26 |
| 2009/0075673 A1 * | 3/2009 | Kim ..................... | G01C 21/343 455/456.1 |

(Continued)

*Primary Examiner* — Rodney Butler
*Assistant Examiner* — Frederick Brushaber
(74) *Attorney, Agent, or Firm* — Knobbe, Martens, Olson & Bear, LLP

(57) ABSTRACT

Various embodiments relate generally to a system, a device and a method provide for a modification of direction of travel based on, for example, proximity thresholds and adaptive alerts specifying an action item. In one or more embodiments, a method can include receiving at a device action alert data including data representing a destination at which an action item resides and data representing an event time frame during which the action item is actionable. Also, the method can include determining at a processor data representing a proximity threshold value relative to a detected location data as a function of at least a rate of travel to form a subset of proximity threshold data specifying the proximity threshold value under which generation of an adaptive alert is enabled. The method can facilitate a change in travel from a first path segment to a second path segment to the destination.

21 Claims, 11 Drawing Sheets

(56) References Cited

U.S. PATENT DOCUMENTS

| | | | |
|---|---|---|---|
| 2010/0186244 A1* | 7/2010 | Schwindt | B60R 11/04 33/288 |
| 2010/0228574 A1* | 9/2010 | Mundinger | G06Q 10/047 705/4 |
| 2011/0137834 A1* | 6/2011 | Ide | G06N 99/005 706/12 |
| 2011/0143726 A1* | 6/2011 | de Silva | G01C 21/3688 455/414.1 |
| 2011/0230178 A1* | 9/2011 | Jones | H04M 1/0235 455/422.1 |
| 2012/0155800 A1* | 6/2012 | Cottrell | G02B 6/04 385/31 |
| 2012/0179361 A1* | 7/2012 | Mineta | G01C 21/3676 701/410 |
| 2012/0208559 A1* | 8/2012 | Svendsen | G01C 21/362 455/456.2 |
| 2012/0265433 A1* | 10/2012 | Viola | G01C 21/362 701/410 |
| 2012/0316763 A1* | 12/2012 | Haynes, III | G01C 21/3492 701/117 |
| 2013/0166096 A1* | 6/2013 | Jotanovic | G01C 21/3617 701/1 |
| 2014/0052374 A1* | 2/2014 | Hoch | G01C 21/343 701/533 |
| 2014/0281955 A1* | 9/2014 | Sprenger | G06F 3/016 715/702 |
| 2014/0288832 A1* | 9/2014 | Hoch | B60L 3/12 701/538 |
| 2016/0156773 A1* | 6/2016 | Chanda | H04M 1/72522 455/414.1 |

\* cited by examiner

SYSTEMS AND METHODS TO MODIFY DIRECTION OF TRAVEL AS A FUNCTION OF ACTION ITEMS

FIELD

Various embodiments relate generally to electrical and electronic hardware, computer software, wired and wireless network communications, and wearable computing devices for transiting to destinations of relative importance. More specifically, a system, a device and a method provide for a modification of direction of travel based on, for example, proximity thresholds and adaptive alerts specifying an action item.

BACKGROUND

Conventional techniques for determining whether to perform actions to accomplish tasks have evolved away from mere pen-and-paper implementations as the complexity increases have increasingly relied on technological solutions. With the advent of computing devices, scheduling of tasks electronically has enabled users to focus on various tasks while reminded of critical tasks that are to be performed.

For example, some conventional approaches to determining whether to perform a task can be tracked using management applications, such as a calendar application, at an opportune or required point in time. Further, with increasing usage of mobile devices, such as mobile smart phones, has facilitated the use of visual depictions of maps and relative traffic speeds via roadways for automobiles. With the use of traditional electronic calendars and mapping applications in mobile devices, users have been able to achieve at least some degree of efficiency in the performance of some tasks. Regardless of the availability of mapping and calendaring applications, conventional uses thereof are not well-suited to facilitate travel to complete multiple tasks without expending resources or requiring manual intervention to estimate whether multiple tasks may be performed without missing other critical tasks.

While conventional approaches are functional, the usual structures and/or functionalities for managing completion of tasks are not well-suitable to the increasing technological demands required to optimally perform tasks.

Thus, what is needed is a solution for conveying notice or otherwise initiating the fulfillment of time-sensitive items effectively without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
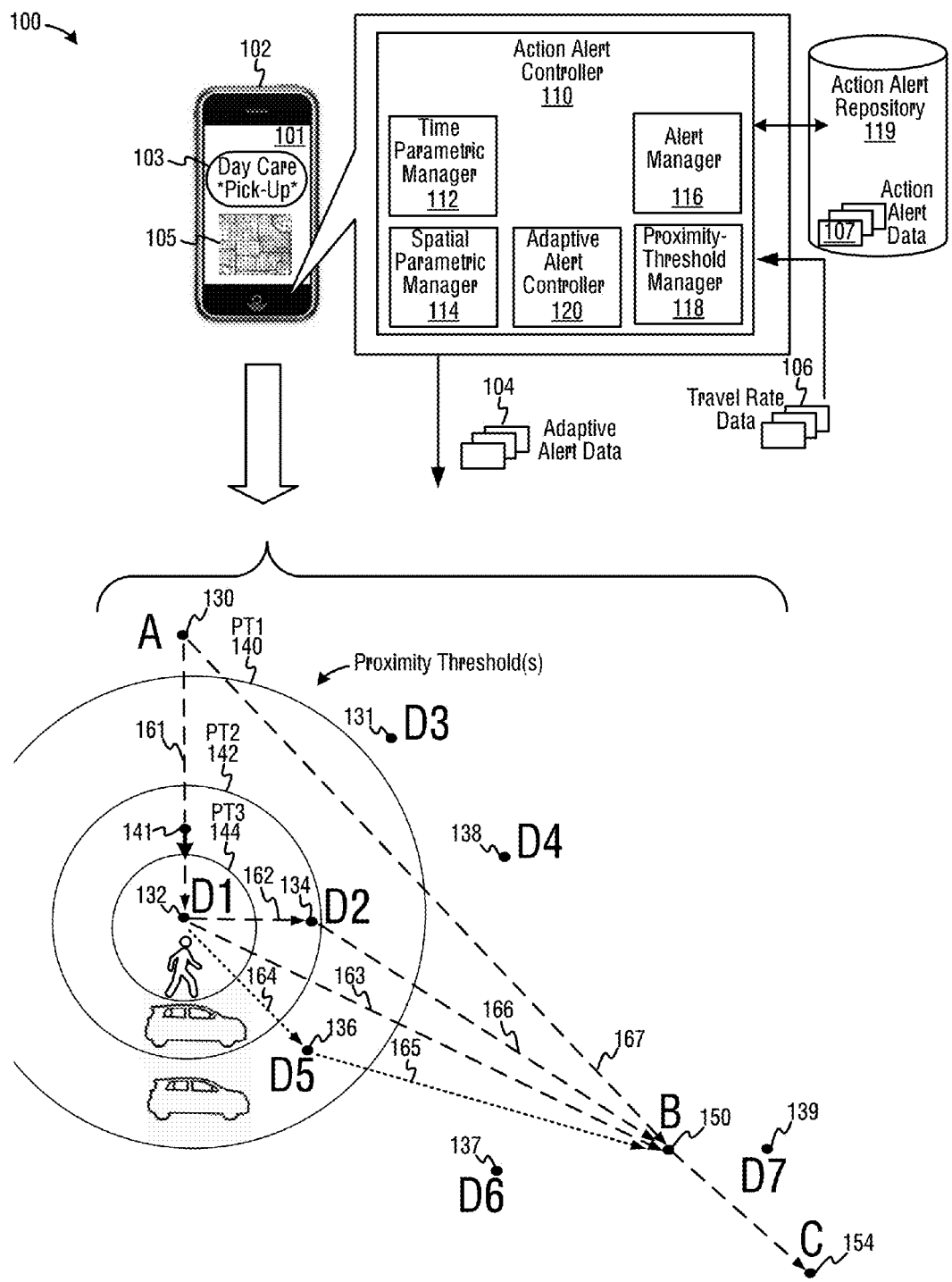
FIG. 1 is a diagram depicting an action alert controller, according to some embodiments.

FIG. 1 is a diagram depicting an action alert controller, according to some embodiments. Diagram 100 includes an action alert controller 110 that is configured to determine whether to generate an adaptive alert to facilitate or cause modification of a direction of travel as a function of an ability to accomplish an action item relative to, for example, a proximity threshold. An adaptive alert (or the presentation thereof) can be configured to serve as a notification and/or instructive information for accomplishing an action item. Examples of a notification and instructive information are notification 103 to pick up a child at daycare and navigable map 105, respectively. As a user travels during one's daily life, action alert controller 110 is configured to adaptively alert the user to various items, including objects, products, services or activities, that the user may engage based on time, location, and rates of travel, among other things. For example, as one travels among home, work, and other destinations to perform errands relating to various action items, action alert controller 110 may generate alerts adapted to, for example, a user's particular location at a specific time relative to one or more proximity thresholds. Examples of action items include picking up or dropping off a child at daycare, purchasing a prescription at a pharmacy, shopping at a farmers' market, attending piano lessons, purchasing groceries or other products, and the like.

Action alert controller 110 is configured to enable or disable the presentation of an adaptive alert based on a number of parameters, including time-related parameters and spatial-related parameters, which may influence determination of a proximity threshold. As shown, action alert controller 110, or portions thereof, may be disposed in a mobile computing device 102 and configured to receive any number of subsets of action alert data that specify parameters for associated action items. In some examples, action alert data can be stored and/or retrieved as action alert data 107 from an action alert repository 119. Action alert controller 110 is also shown to receive data representing the rate of travel (e.g., travel rate data 106) associated with one or more periods of time and path segments relative to any number of destinations at which action items may be fulfilled. Examples of destinations are depicted in FIG. 1 as destinations D1 to D7. According to some examples, action alert controller 110 can generate adaptive alert data 104 to effect or otherwise present one or more alerts to a user adapted to one or more of a point in time, a geographic location, a proximity to a destination, a predicted rate of travel, a relative importance of an action item relative to other action items, as well as other parameters.

Further to FIG. 1, action alert controller 110 may enable or disable/suppress presentation of an adaptive alert based on one or more proximity thresholds, such as proximity threshold ("PT1") 140, proximity threshold ("PT2") 142, and proximity threshold ("PT3") 144 as well as values thereof. According to some embodiments, a proximity threshold defines a boundary under which an action item may be fulfilled, for example, with minimal or negligible impact on fulfilling other action items, the boundary being calculated as a function of one or more of time, geographic location, distance, and other parameters. An example of implementing proximity thresholds to modify a direction of travel is described in relation to action alert controller 110, which is depicted as including a time parametric manager 112, a spatial parametric manager 114, an alert manager 116, a proximity threshold manager 118, and an adaptive alert controller 120, according to some embodiments.

Time parametric manager 112 is configured to identify time-related attributes, including a current time or point in time (e.g., 4:00 pm CDT) and one or more predicted times (e.g., estimated times of arrival based on, for instance, rates of travel) for a fulfilling action items. Also, time parametric manager 112 is configured to identify time-related parameters, including time-related parameters associated with an action item, such as event timeframes during which the action items are actionable (e.g., available for fulfillment). Further, time parametric manager 112 may be configured to manage or monitor one or more time-related attributes (e.g., current time) for comparison against one or more time-related parameters (e.g., date, time, and hours in which a farmers' market is open), and to generate data indicating a match. For example, time parametric manager 112 can determine that a point in time coincides (e.g., or nearly coincides with) a duration of an event time frame that the action item is actionable.

Spatial parametric manager 114 is configured to identify spatial-related attributes, including a location geographic location or region (e.g., a current location expressed in, for instance, longitude and latitude coordinates, GPS coordinates, etc.) and one or more distances or estimated distances (e.g., distances based on, for instance, changes in directions and routes of travel) for a fulfilling action items. Also, spatial parametric manager 114 is configured to identify spatial-related parameters, including spatial-related parameters associated with action items, such as locations of destinations at which the action items are actionable (e.g., available for fulfillment). According to some embodiments, an action item having a specific item type may have a specific destination type (e.g., a unique location) at which an action item is actionable, such as picking up a child from a specific day care facility. As such, the action item with a specific item type may have a unique location. By contrast, an action item having a general item type may be associated with a general destination type (e.g., multiple alternative locations) at which an action item may be satisfied. For example, an action item with the general item type may be actionable at multiple locations or destination, such as purchasing generic trash bags at any store (e.g., at any grocery store, drugstore, hardware store, etc.). Further, spatial parametric manager 114 may be configured to manage or monitor one or more spatial-related attributes (e.g., current location) for comparison against one or more spatial-related parameters (e.g., destination locations), and to generate data indicating a match. For example, spatial parametric manager 114 can detect a location at which mobile computing device 102 coincides (or nearly coincides) to form detected location data that may represent a current location.

Alert manager 116, according to some examples, may identify at least a subset of action alert data 107 that represents an action item. Action alert data 107 include a data arrangement having data representing a destination at which the action item resides or maybe fulfilled and data representing an event time frame during which the action item is actionable (e.g., available for fulfillment). Examples of an event time frame include a point in time, such as a scheduled time at which a day care facility closes (e.g., 6 pm), and ranges of time (e.g., a time range in which a pharmacy is open (e.g., 10 am to 9 pm). Alert manager 116 may be configured to manage data representing action items, such as action alert data, including the creation of data arrangements with new or modified parametric data or values. Alert manager 116, at least in accordance with some embodiments, may also manage and associate (e.g., via a data arrangement) other parameters and parametric values to an action item, such as an item type, a destination type, a priority factor, a proximity factor, and other parameters, examples of which are described below.

Proximity threshold manager 118 may be configured to calculate proximity-threshold value for one or more action items based on one or more of time, geographic location, distance, and rates of traffic over one or more path segments (or routes), according to some embodiments. Also, proximity threshold manager 118 may be configured to identify data representing a rate of travel to form travel rate data (e.g., data representing a speed at which a user is walking, driving, or otherwise moving by way of train, boat, plane, etc.). Proximity threshold manager 118 may also be configured to determine data representing a proximity threshold value (e.g., relative to a detected location data) as a function of at least a rate of travel to form a subset of proximity threshold data, which may specify a proximity threshold value ("PTV") under which generation of an adaptive alert is enabled.

Adaptive alert controller 120 may be configured to initiate presentation of an adaptive alert, for example, responsive to determining the proximity threshold value is below a proximity threshold. Thus, the adaptive alert may be configured to adapt an alert (e.g., based on at least the proximity threshold value) to facilitate a change in travel from a first path segment to a second path segment to travel to the destination at which the action item is actionable. For example, the adaptive alert may facilitate a change direction travel to cause a distance between the detected location and the destination to converge. As another example, adaptive alert controller 120 may be configured to initiate an electronic presentation of a route to a display 101 of mobile computing device 102.

To illustrate a case in which action alert controller 110 implements proximity threshold manager 118, consider the following example in which a user is initially at work in an office building at a location ("A") 130. As the workday draws to an end, the user expects to travel over one or more paths or path segments to attend a piano lesson at location ("B") 150 at a specific time (e.g., 6 pm), after which the user travels to the user's home at location ("C") 154. Consider further that action alert controller 110 can generate an adaptive alert upon determining that a time is prior to a user beginning travel (e.g., based on time, such as at 5 pm or by detecting a signal, such as a BlueTooth® signal, indicating the user enters a car). Also, action alert controller 110 can detect a rate of travel and, responsive to the detect travel rate, can generate an adaptive alert to notify a user that a child needs to be picked up at a day care facility located at destination ("D1") 132. Also, action alert controller 110 can be configured to identify a number of destinations at which corresponding action items may or may not be actionable. Examples of such destinations include destination ("D2") 134 at which a pharmacy is located, destination ("D3") 131, destination ("D4") 138, destination ("D5") 136 at which a farmers' market is located, destination ("D6") 137, and destination ("D7") 139.

Continuing with the above example, action alert controller 110 can thereby generate an adaptive alert to modify a direction of travel from along a number of path segments constituting a route 167 (i.e., a route directly to piano lessons at destination 150) to another number of path segments constituting a route 161 to destination 132. Therefore, the user is reminded to pick up his or her child rather than heading directly via route 167 to location 150. During travel along route 161, action alert controller 110 can determine that another action item indicates a prescription is filled and available for pick-up at a pharmacy at destination 134. Yet another action item indicates a farmers' market is open for grocery shopping at destination 134. Further, action alert controller 110 can determine or receive travel rate data specifying a rate of travel at 141.

In one particular instance, consider that travel rate data 106 indicates the user is traveling at a walking speed at 141. As such, proximity threshold manager 118 may calculate a proximity threshold value ("PT3") 144 under which action alerts can be generated for destinations diagrammatically located within the area bounded by proximity threshold value 144. Proximity threshold value 144 may specify a boundary under which the prescription can be picked up with, for example, minimal or negligible impact on attending the piano lesson at location 150 at 6 pm. In some examples, proximity threshold value 144 can be calculated using a predicted distance (e.g., a predicted maximum distance) between location 132 and a predicted location over which a rate of travel along a route (e.g., route 162) is determined. Proximity threshold value 144 may also be calculated using the remaining distances for the remaining path segments constituting a route (e.g., a route 166) to location 150 and the corresponding rates of travel, to ensure timely arrival for the piano lesson. As destinations 134 and 136 are beyond proximity threshold value 144, adaptive alert controller 120 may operate to suppress adaptive alerts that otherwise can notify the user of the availability of the prescription or the farmers' market. Thus, the user will not be distracted by alerts for picking up the prescription and may travel along route 163.

In another instance, consider that travel rate data 106 indicates the user is traveling at a speed indicative of traveling by car. As such, proximity threshold manager 118 may calculate a proximity threshold value ("PT2") 142 under which action alerts can be generated for destinations diagrammatically located within the area bounded by proximity threshold value 142 (e.g., specifying another boundary under which the prescription can be fulfilled with sufficient time to travel over route 166 to arrive at location 150 at 6 pm). In some examples, proximity threshold value 142 can be calculated using a predicted distance (e.g., a predicted maximum distance) between location 132 and a predicted location over which a rate of travel along a route (e.g., 162) is determined. Also, proximity threshold value 144 may be calculated using the remaining distances for the remaining path segments constituting a route (e.g., a route 166) from the predicted distance to location 150, and based on the corresponding rates of travel to ensure timely arrival for the piano lesson. Note that as destination 136 and other destinations are beyond proximity threshold value 142, adaptive alert controller 120 may operate to suppress adaptive alerts that otherwise can notify the user of the availability of farmers' market. For example, travel along route 164 to destination 136 relative to location 131, and subsequent travel over route 165 (with a corresponding rate of travel), may not be enable sufficient time to visit the farmers' market and make it to the piano lesson. However, as destination 134 falls within an area defined by the boundary identified as proximity threshold value 142, adaptive alert controller 120 may generate an adaptive alert to cause a direction of travel to change from what otherwise might be route 163 to route 162 to pick up the prescription.

In yet another example, consider that the piano lesson at location 150 is canceled, thereby removing a requirement to be at a destination 150 (e.g., as a target destination) at a specific point in time. In this case, user may arrive home at location 154 at a later time. Proximity threshold manager 118 may calculate a proximity threshold value ("PT1") 141, whereby destination 136 falls within a region identified by proximity threshold value 140. As such, adaptive alert controller 120 may generate adaptive alerts for fulfilling action items at both destination 134 and destination 136.

According to specific example, action alert controller 110 can receive an electronic message, such as a text message from a pharmacy at location 134. The electronic message can include data representing an identifier (e.g., a telephone number, address, etc.) indicating a destination 132 at which another action item resides (i.e., picking up a prescription). Action alert controller 110 may fetch at least another portion of a subset of action alert data 107 from action alert repository 119 to access data representing an event time frame during which picking up the prescription is actionable. If actionable, adaptive alert controller 120 can generate data 104 representing another adaptive alert.

In view of the foregoing, the structures and/or functionalities of action alert controller 110 can facilitate communication to a user of one or more action items that may be fulfilled conveniently during travel and opportunistically such that later scheduled activities are minimally or negligibly impacted. In accordance with various embodiments, a proximity threshold value is a representation indicative of a user's ability to fulfill subsidiary action items at the user's election or when convenient, as well as whether an item is scarce or abundant and/or its relative importance. Adaptive alerts may be presented or suppressed based on a type of item (e.g., whether the action item is specialized or general in nature) and/or on a destination type (e.g., whether the destination is specialized or general in nature). For example, if a user wishes to pick up a porterhouse steak as a general item type, then such cut of beef may be available at a specialized destination type (e.g., a neighborhood butcher) or at generalized destination type (e.g., supermarket chain). Adaptive alerts may provide directions to both destinations via presentation to the user, but if the neighborhood butcher is located beyond a corresponding proximity threshold value then and the associated adaptive alert may be suppressed. In some cases, a proximity threshold value may be adjusted based on, for example, subsequent changes in rates of travel, thereby adding or suppressing adaptive alerts to ensure optimal fulfillment of action items while meeting subsequent obligations timely. In at least some examples, the implementation of adaptive alerts may be a function of a priority factor assigned to one action item relative to other action items. For example, picking up a child at daycare may be associated with highest priority that, for example, cannot be superseded by other action items absent implementation of failsafe mechanisms.

Note that according to various embodiments, action alert controller 110 and its elements can be implemented in either hardware or software, or a combination thereof. Further, more or fewer components depicted as constituting action alert controller 110 may or may not be implemented, and the components constituting action alert 110 may reside in mobile computing device 102 or a computer readable medium (not shown) downloadable to mobile computing device 102. Alternatively, any combination of components of action alert controller 110 can be distributed among mobile computing device 102 or other structures or devices, according to other examples. According to some embodiments, the term "attribute" contextually may be interchangeable with the term "parameter."

Figure 2:
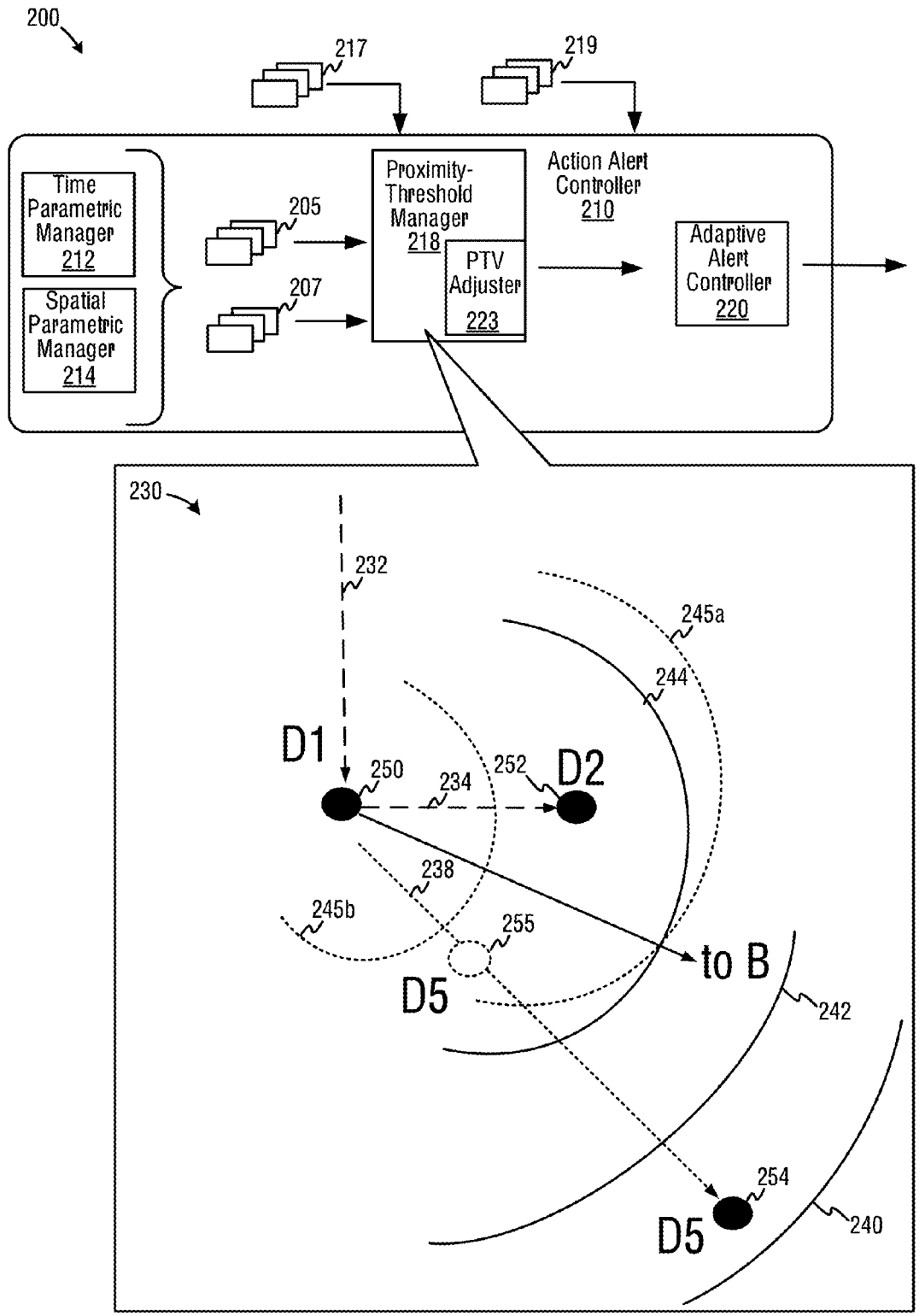
FIG. 2 is a functional block diagram depicting an example of operability of a proximity threshold manager, according to some examples.

FIG. 2 is a functional block diagram depicting an example of operability of a proximity threshold manager, according to some examples. Diagram 200 depicts an action alert controller 210 including a time parametric manager 212 configured to provide time-related data 205, a spatial parametric manager 214 configured to provide spatial-related data 207, a proximity threshold manager 218, and an adaptive alert controller 220. Note that elements depicted in diagram 200 may include structures and/or functions as similarly-named or similarly-numbered elements of FIG. 1.

To illustrate operation of proximity threshold manager 218, consider the following first example. Action alert controller 210 is configured to fetch or otherwise receive a subset of action alert data 217 for a first alert item from an action alert repository. Subset of action alert data 217 may also include data representing a first event time frame during which the first action item is actionable at destination ("D2") 252. Adaptive alert controller 220 may be configured to identify or otherwise generate data representing a first adaptive alert to initiate a first adaptive alert to facilitate a change in direction of travel from path segment 232 to path segment 234, as shown in inset 230. Proximity threshold manager 218 may be configured to determine data representing a first proximity threshold value 244 relative to the detected location data identifying location 250 as a function of a first rate of travel to form a first subset of proximity threshold data that specifies a first proximity threshold value under which generation of the first adaptive alert is enabled.

Also, alert controller 210 is configured to fetch or otherwise receive a subset of action alert data 219 for a second alert item from the action alert repository. Subset of action alert data 219 may also include data representing a second event time frame during which the second action item is actionable at destination ("D5") 255. Adaptive alert controller 220 may be configured to identify or otherwise generate data representing a second adaptive alert to initiate a second adaptive alert to facilitate a change in direction of travel from path segment 232 to path segment 238, as shown in inset 230. Proximity threshold manager 218 may be configured to determine data representing a second proximity threshold value, such as one or both of proximity threshold value 240 and proximity threshold value 242, relative to the detected location data as a function of a second rate of travel to form a second subset of proximity threshold data specifying the second proximity threshold value under which generation of the second adaptive alert is enabled. For proximity threshold value 240 and proximity threshold value 242, adaptive alert controller 220 may be configured to enable and disable, respectively, the second adaptive alert.

To illustrate further operation of proximity threshold manager 218, consider the following example. Action alert data 217 may include additional parameters including an item type specifying that the first action item is a specialized item at destination 252. For example, a specialized item can be a child or a product having a uniquely branded (e.g., trademarked) name. For purposes of this example, consider that location of destination 254 is disposed at location 255, which may cause both destination 252 and destination 255 being at least equidistant from location 250. Action alert data 219 may include additional parameters including an item type specifying that the second action item is a generalized or generic item at destination 255. For example, a generalized item can be a generic product, such as a no-brand box of garbage bags, milk, nails, etc. In some cases, an action item associated with a specialized item may be prioritized higher than another action item associated with generic item. According to some embodiments, a proximity threshold value adjuster ("PTV adjuster") 223 can be configured to adjust the value of the proximity threshold to reflect whether an item type is specialized or generalized and/or whether the destination type is specialized or generalized. As shown, a specialized item that is at destination 252 can cause proximity threshold value adjuster 223 to generate an increased proximity threshold value 245a, whereas a generalized item to be found at destination 255 can cause proximity threshold value adjuster 223 to generate a reduced proximity threshold value 245b (relative to proximity threshold value 244) for the generic item at destination 255. As such, decreasing the proximity threshold value to 245b effectively reduces the likelihood that sufficient time exists to fulfill an action item at location 255. Adaptive alert controller 220 may proximity threshold value 245a against proximity threshold value 245b to select destination 252 as the subject of an adaptive alert.

To illustrate additional features of proximity threshold manager 218, consider the following example. Action alert data 217 may include additional parameters including a first priority factor for the first action item at destination 252, whereas action alert data 219 may include additional parameters including a second priority factor for the second action item at destination 255. In this example, the first action item may be a doctor's appointment at a specialized doctor, whereas the second action item may be to purchase generic sandwich bags. Accordingly, the first action item may be prioritized higher than the second action item. As such, proximity threshold manager 218 and/or PTV adjuster 223 may adjust or identify that a second proximity threshold value associated with the second action item is exceeded due to the second priority factor value. Thus, adaptive alert controller 220 may operate to suppress presentation of an adaptive alert for the purchase of generic sandwich bags.

To illustrate yet another example, consider an action item having a hybrid item type or destination type. For example, a hybrid item type can be both a specialized item and/or a generic item for a first condition (e.g., first time frame), or one or the other of a specialized and a generic item for a respective condition (e.g., specialized for a first time frame and generic for a second time frame). For example, attending a local farmers' market may be a specialized item on a weekday, and attending another farmers' market 20 miles away from home may be a generic item on a weekend day. Similarly, a hybrid destination type can be both a specialized destination and/or a generic destination based a condition, or one or the other of a specialized destination and a generic destination for another condition. For example, the destination type at which a porterhouse may be available can be a hybrid destination type. That is, the destination type may be specialized (i.e., preference for a neighborhood butcher at destination 252) during the hours in which a butcher is open, and may be generalized (i.e., sufficient to pick up a steak at the grocery store chain that is open 24 hours at destination 255). Therefore, adaptive alert controller 220 may operate to generate a first adaptive alert associated with distinction 252 during a first time period (e.g., during butcher shop hours), and further may operate to generate an adaptive alert associated with destination 255 during a second time period (e.g., when the butcher shop is closed). Thus, either the first or second adaptive alert may be suppressed based on whether a point in time falls within the first or second time periods.

Figure 3:
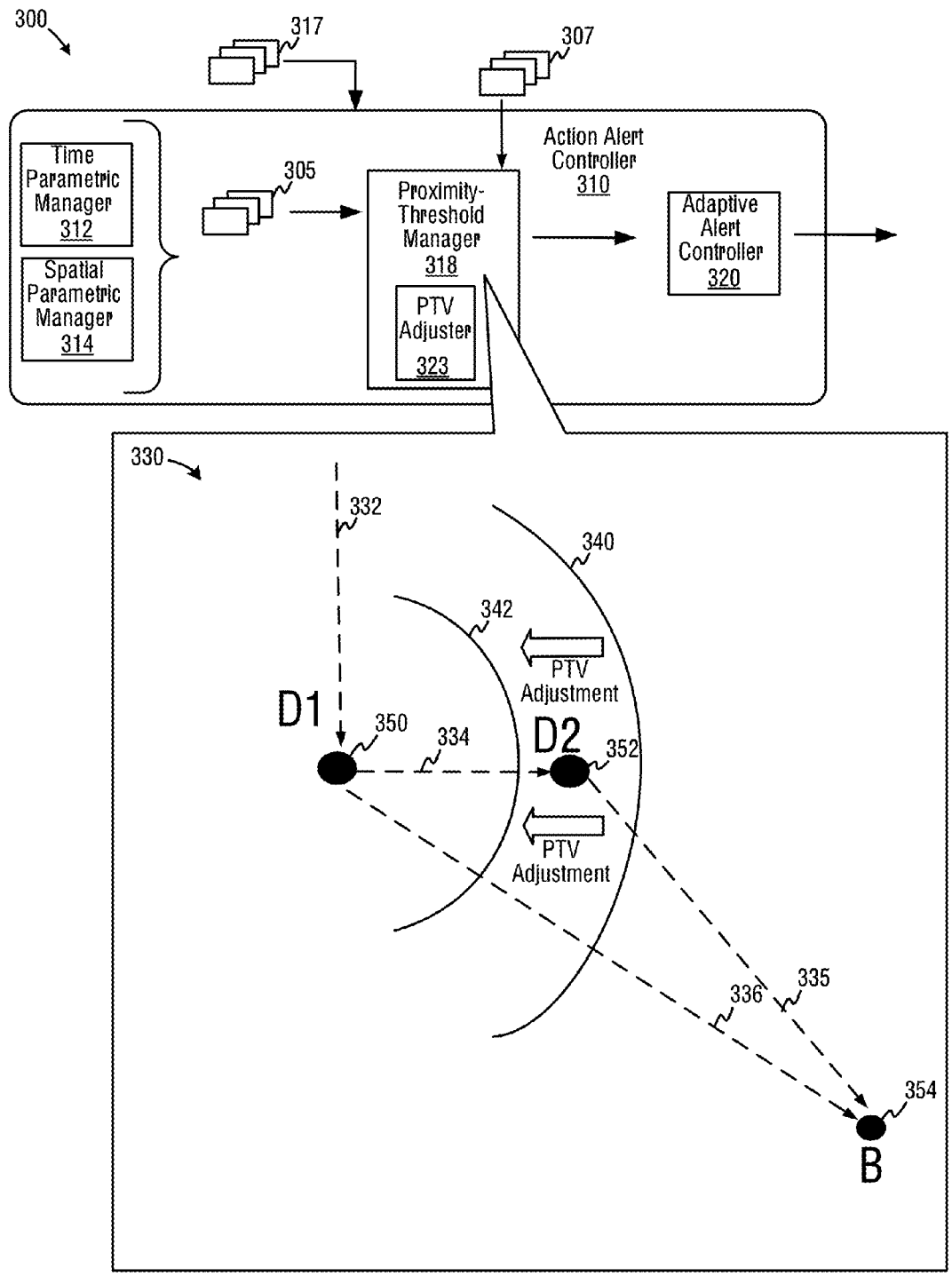
FIG. 3 is a functional block diagram depicting another example of operability of a proximity threshold manager, according to some examples.

FIG. 3 is a functional block diagram depicting another example of operability of a proximity threshold manager, according to some examples. Diagram 300 depicts an action alert controller 310 including a time parametric manager 312 and a spatial parametric manager 314 configured to provide both time-related data and spatial-related data 305, a proximity threshold manager 318, and an adaptive alert controller 320. Note that elements depicted in diagram 300 may include structures and/or functions as similarly-named or similarly-numbered elements of FIG. 2.

Further, consider that action alert controller 310 is configured to identify action alert data 317 representing an action item (e.g., attending piano lesson) at a target destination ("B") 354 at a target event time frame including 6 pm. Proximity threshold manager 318 may determine the data representing a proximity threshold value by determining an alert attribute, such as a priority factor, associated with the target destination, and adjusting or modifying a proximity threshold value based on the alert attribute. To illustrate, consider inset 330 in which a user may be traveling along a path segment 332 during which proximity threshold value 340 enables the generation of an adaptive alert for fulfilling an action item at destination ("D2") 352. However, upon reaching a location ("D1") 350, consider that an alert attribute has changed, which, in turn, causes proximity threshold value adjuster 323 to reduce the proximity threshold value from 340 to 342. For example, consider the rate of travel 335 is significantly increased due to a major traffic accident. Therefore, the time to travel path segments 334 and 335 may cause the user to arrive late at destination 354. Responsive to the reduced proximity threshold value 342, an adaptive alert for destination 352 is suppressed, thereby facilitating travel along a path segment 336 for an on-time arrival at destination 354.

In one example, proximity threshold value adjuster 323 can operate to determine rates of travel over a plurality of routes and/or path segments from location 350 via destination 352 to target destination 354, and calculate, for example, a maximum amount of time to travel from location 350 via destination 352 to target destination 354. Then, proximity threshold value adjuster 323 can set the proximity threshold value from 340 to 342 (e.g., proximity threshold value 340 is inactive) so as to ensure a maximum allowable amount of time to travel is less than (or no greater than) an amount of time to travel via path segment 336 to target destination 354. In this case, the user is encouraged to take route 336 to arrive timely at location 354 rather than taking other routes, Note that since an amount of time to travel over paths 334 and 335 is greater than traveling over path segment 336, and, therefore, the proximity threshold value adjuster 323 uses proximity threshold value 342 to ensure an alert to change direction of travel destination 352 is disabled.

Figure 4:
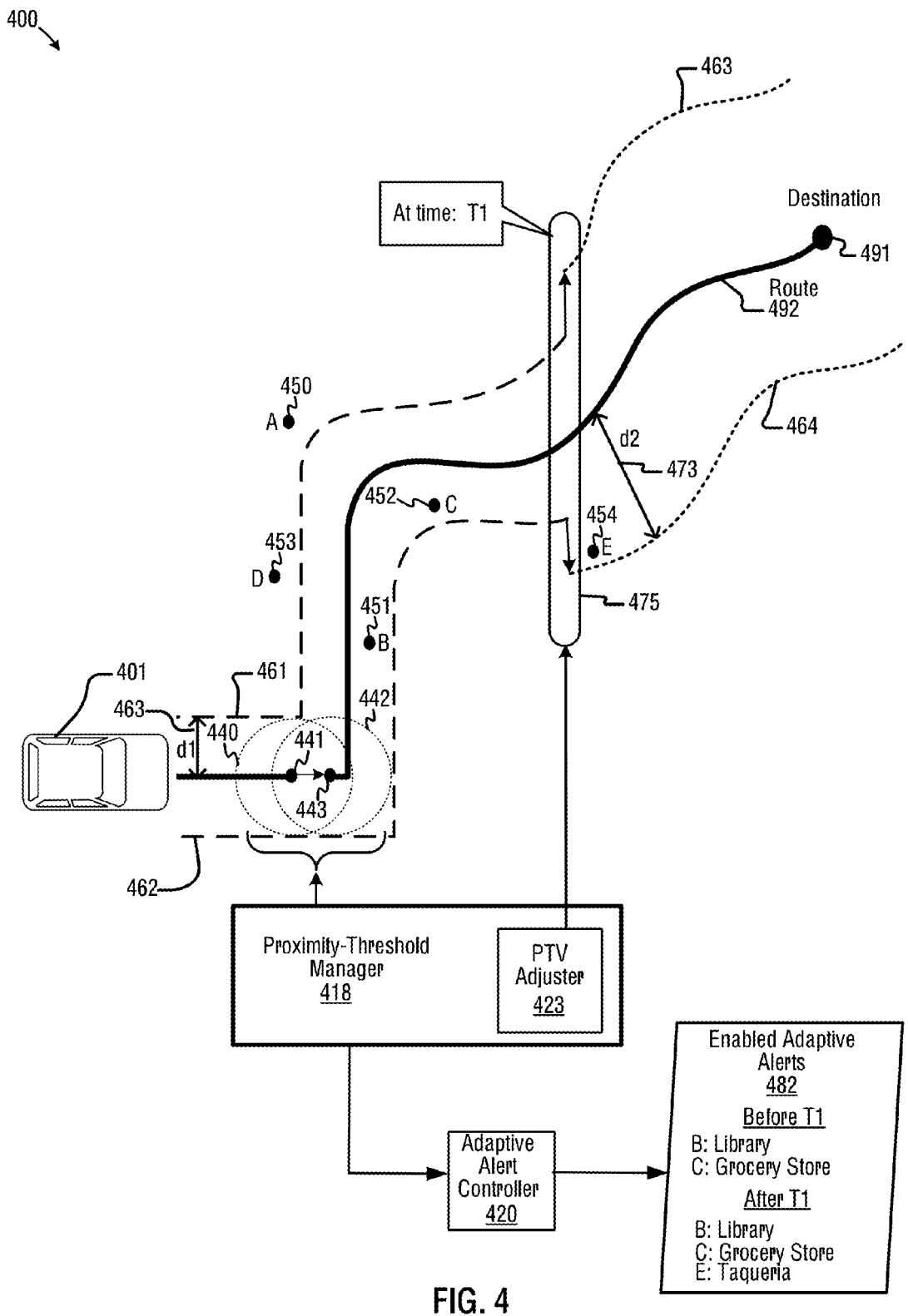
FIG. 4 is a diagram depicting an example of a proximity threshold value adjuster, according to some examples.

FIG. 4 is a diagram depicting an example of a proximity threshold value adjuster, according to some examples. Diagram 400 includes a proximity threshold manager 418 having a proximity threshold value adjuster 423 disposed therein. Also included is an adaptive alert controller 420 that is configured to identify and/or enable adaptive alerts, as shown as data representing enabled adaptive alerts 482. In the example shown, proximity threshold manager 418 is configured to repeatedly (e.g., continually, aperiodically, periodically, etc.) calculate a proximity threshold value as a user (e.g., including a mobile computing device having one or more structures and/or functions described herein) in a car 401 traverses a route 492 to a destination 491. For example, proximity threshold manager 418 is shown to determine a proximity threshold value 440 at location 441 and a proximity threshold value 442 at location 443. Therefore, as car 401 travels over route 492, proximity threshold manager 418 can define boundaries 461 and 462 (e.g., as set by proximity threshold values 440 and 442, and the like) at, for example, a distance ("d1") 463, under which adaptive alerts may be enabled.

Adaptive alert controller 420 may use boundaries 461 and 462 to identify action items, such as visiting a library ("B") and a grocery store ("C") for which adaptive alerts may be enabled. In particular, library B can be detected at a location 451 and grocery store C can be detected at a location 452, both of which within boundaries 461 and 462 before time T1. But note, destination ("A") at location 450 and destination ("D") 453 are both located beyond the calculated proximity threshold values, and, therefore, are external to boundaries 461 and 462. Therefore, adaptive alert controller 420 may be configured to suppress adaptive alerts for destinations at locations 450 and 453.

Further to the example, proximity threshold manager 418 may detect a change in the value before or at time T1 for a time-related attribute or parameter, a spatial-related attribute or parameter, a rate of traffic flow for one or more path segments, or any other changes in parameter values, including a change in priority factor, etc. For example, consider an instance when a previously-identified rate of travel (e.g., a rate of traffic flow) had been identified as being significantly below a speed limit due to, for example, a traffic accident when boundaries 461 and 462 initially had been determined. At time T1, proximity threshold manager 418 can determine an increase in a rate of traffic flow (e.g., an earlier traffic accident has been cleared), and can cause proximity threshold value adjuster 423 to increase the proximity threshold value, which thereby defines updated boundaries 463 and 464 at a distance ("d2") 473 relative to route 492. Within distance 473 (e.g., within an area defined by the increased proximity threshold value), other previously-suppressed adaptive alerts may be enabled, such as an adaptive alert associated with an action item at destination ("E") 454. For example, a taqueria may be co-located at location 454 and a user now may have sufficient time to stop for lunch due to the reduced time to travel over the remainder of route 492 to destination 491. As shown, adaptive alert controller 420 identifies and enables an adaptive alert for the taqueria in addition to the library and the grocery store.

Note that in various embodiments, a shape of a boundary (e.g., boundaries 461 and 462, as well as the boundaries defined by proximity threshold values 440 and 442) need not be limited to circular boundaries, but rather can have any shape or size. For example, boundaries may have irregular shapes due to different path segments traveling in various directions and the various distances, whereby each of those path segments have varied rates of traffic flow. Further, different adaptive alerts and/or different action items may have similar proximity threshold values, or each action item may have a different proximity threshold value, according to various embodiments.

Figure 5:
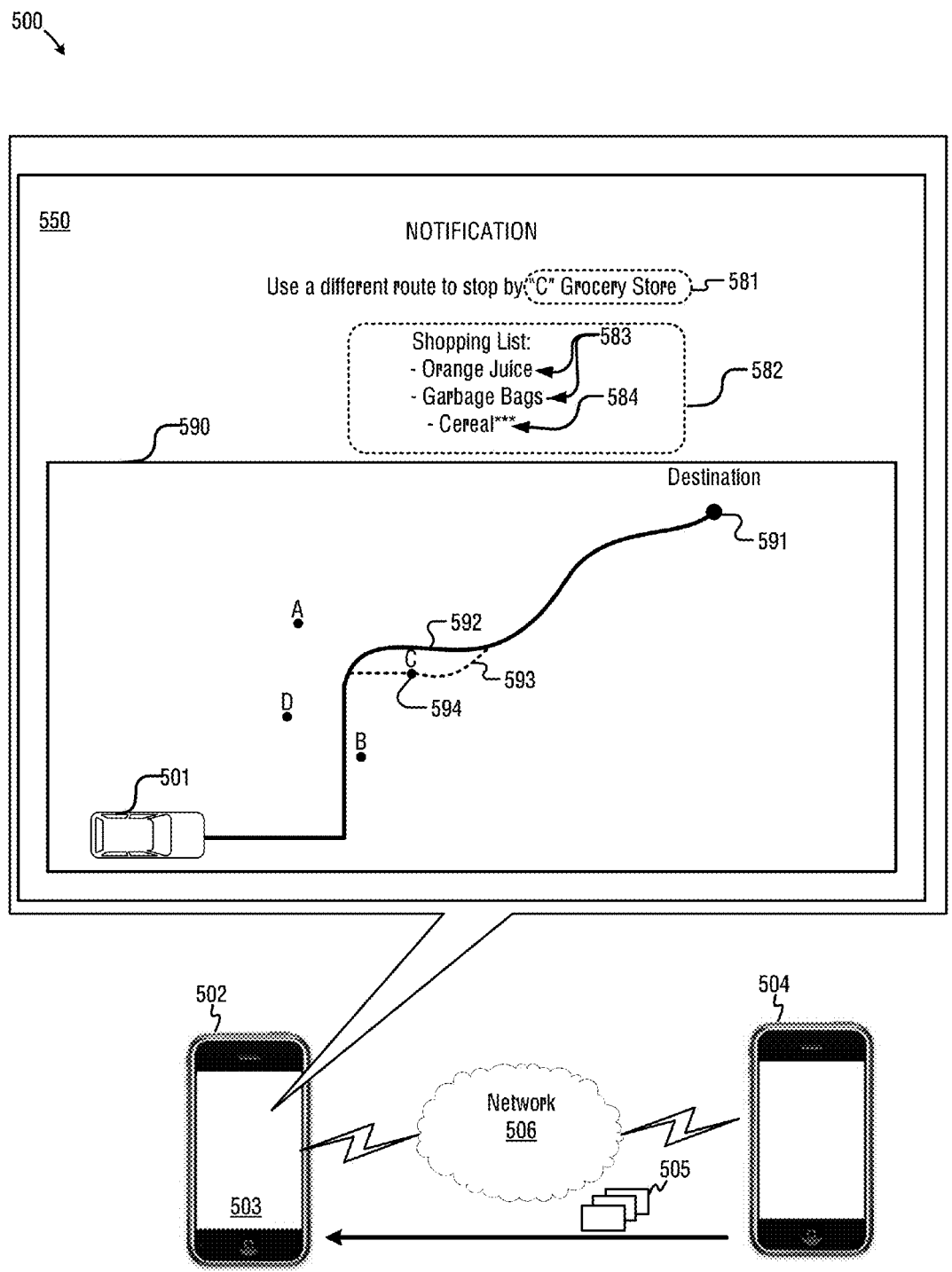
FIG. 5 is a diagram depicting an example of a notification in relation to a presentation of an adaptive alert, according to some examples.

FIG. 5 is a diagram depicting an example of a notification in relation to a presentation of an adaptive alert, according to some examples. Diagram 500 depicts a mobile computing device 502 having, for example, a touch-sensitive interface 503 configured to display notification 550 and/or instructive information, such as an electronic map 590. Notification 550 includes an alert 581 to stop at grocery store ("C") at location 594 to fulfill an action item 582 (e.g., purchase groceries and other products) prior to reaching destination 591. As shown, action item 582 includes items 583 (e.g., orange juice and garbage bags), which is identified by mobile computing device 502. Further, action item 582 includes an item 584 (e.g., cereal), which is appended to the list responsive to a request (e.g., via an electronic message) originating at mobile computing device 504. For example, a user of mobile computing device 504 may transmit a text message 505 via network 506 to mobile computing device 502, whereby text message 505 includes data representing a request for cereal. An action alert controller (not shown) associated with mobile computing device 502 can extract the data representing the request and can use that data to build or enhance action items having similar parameters (e.g., similar locations at which to shop, such as a grocery store). Therefore, a family member, such as a child, can send a text message to a parent to request a new box of cereal, and the parent can purchase a box of cereal when fulfilling action item 582 generally.

Figure 6:
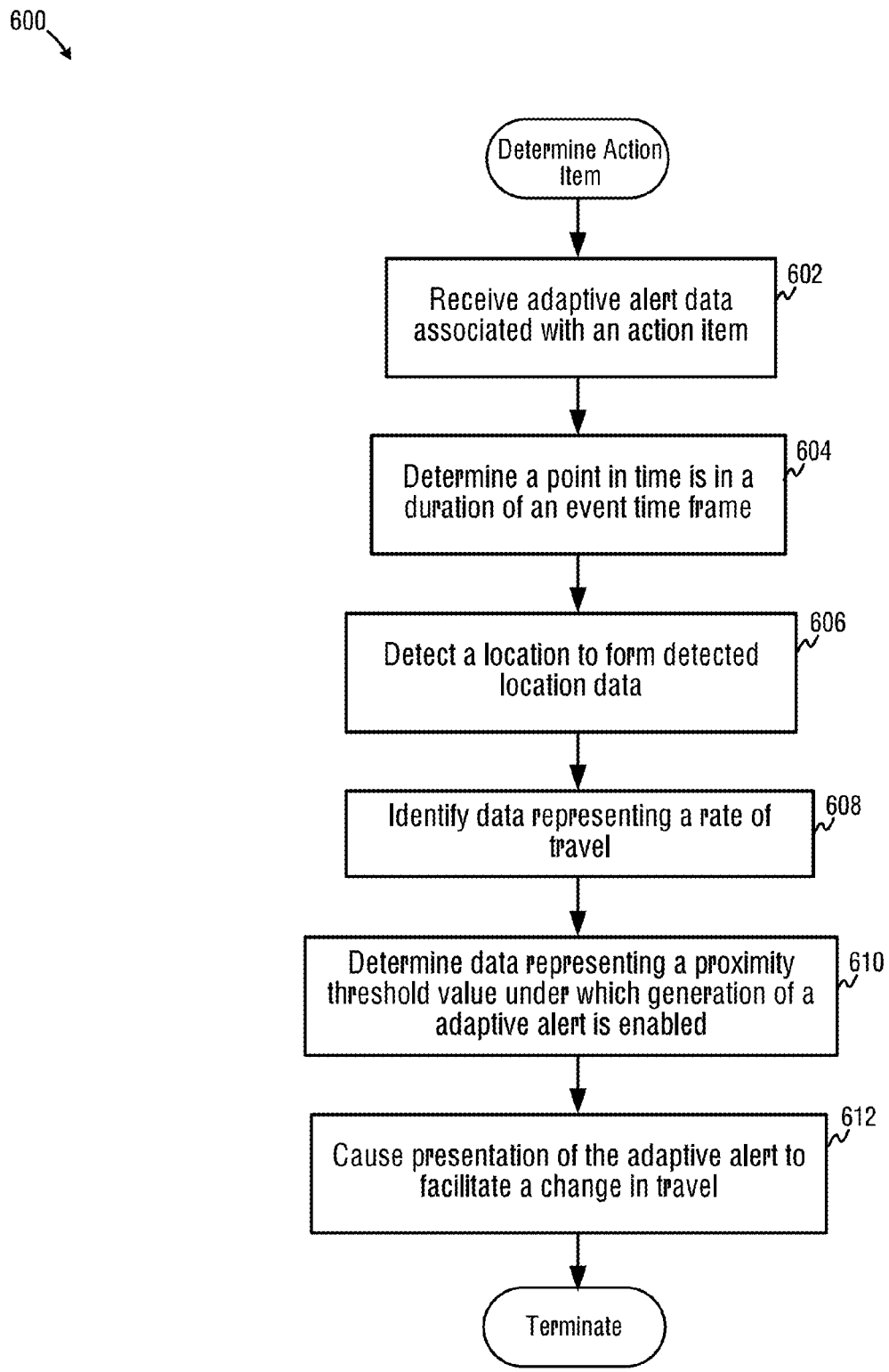
FIG. 6 is an example of a flow diagram to determine an action item for which an adaptive alert may be generated, according to some embodiments.

FIG. 6 is an example of a flow diagram to determine an action item for which an adaptive alert may be generated, according to some embodiments. At 602, flow 600 causes adaptive alert data associated with an action item to be determined or received. The adaptive alert data can include data representing a first destination at which the action item resides and data representing an event time frame during which the action item is actionable. A point in time (or a duration/range of time) that coincides or nearly coincides with a duration of the event time frame is determined at 604. At 606, a location is detected as detected location data, which may represent the location associated with a mobile computing device (e.g., a set of GPS coordinates) at which, for example, a proximity threshold value is determined. Data representing a rate of travel, such as rate of travelling (or velocity) while walking, biking, driving, and/or riding, can be identified at 608. Data representing a proximity threshold value relative to, for example, a detected location data as a function of at least the rate of travel can be used at 610 to form a subset of proximity threshold data. The subset of proximity threshold data can specify a proximity threshold value that causes generation of an adaptive alert (e.g., the proximity threshold value representing a threshold under which generation of the adaptive alert is enabled). At 612, the adaptive alert can be presented (e.g., caused by flow 600 or otherwise initiated by, for example, causing generation of a signal) to solicit, effect, or otherwise urge a change in travel from along a first path segment to along a second path segment to the destination at which the action item can be fulfilled.

Figure 7:
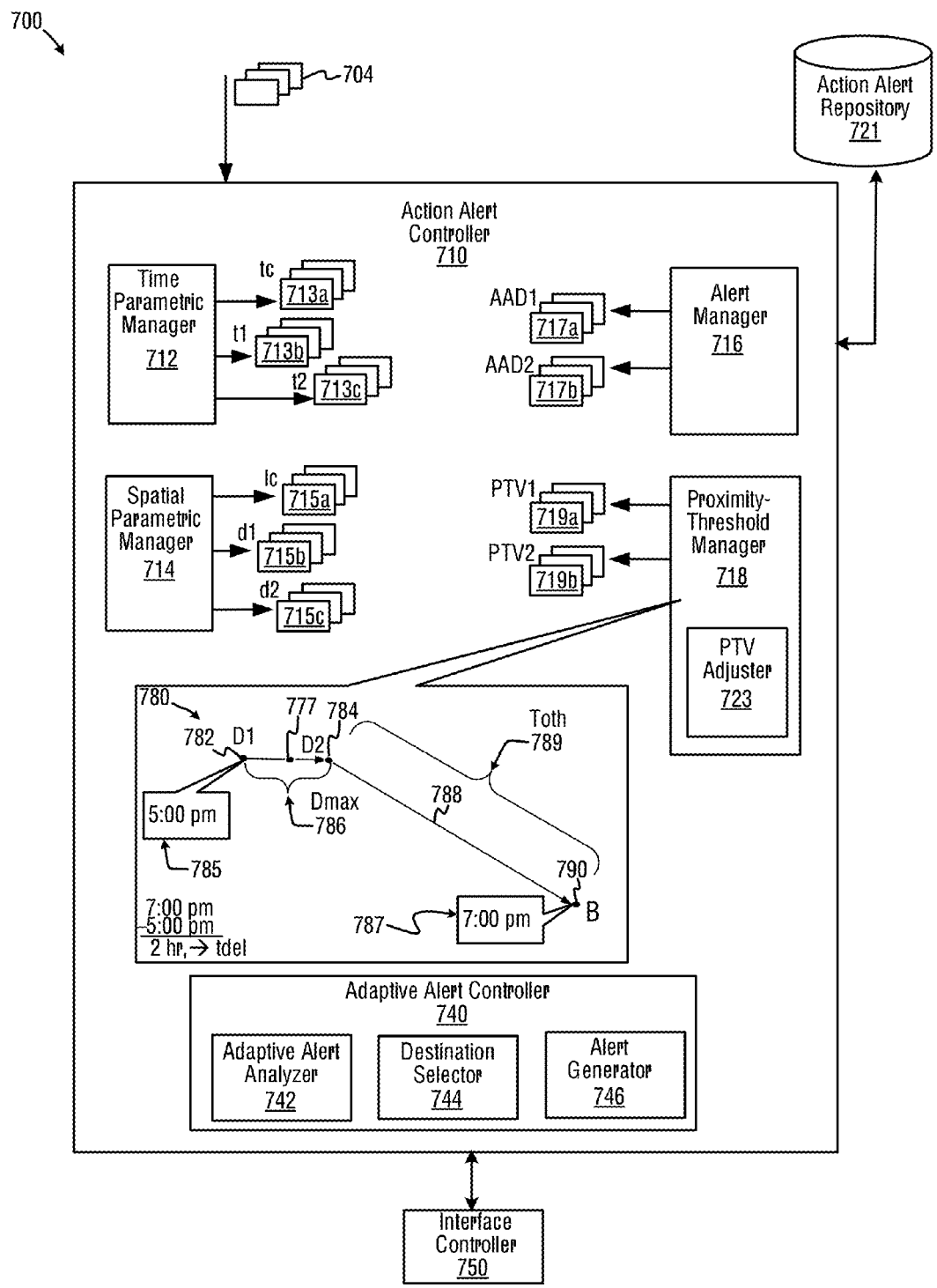
FIG. 7 is a diagram depicting another example of an action alert controller, according to some embodiments.

FIG. 7 is a diagram depicting another example of an action alert controller, according to some embodiments. Diagram 700 includes an action alert controller 710 that is configured to generate an adaptive alert that is adapted to activate as a function of an ability to accomplish an action item relative to, for example, a proximity threshold value. The adaptive alert can be configured to facilitate or cause modification of a direction of travel. As shown, action alert controller 710 is depicted as including a time parametric manager 712, a spatial parametric manager 714, an alert manager 716, a proximity threshold manager 718, an adaptive alert controller 720, and an action alert repository 721, according to some embodiments. Further, action alert controller 710 can be coupled to an interface controller 750 for generating data to cause a user interface or display to present information associated with the adaptive alert. Interface controller 750 can also include logic figured to detect user inputs or other signals via, for example, a touch-sensitive display. Further, interface controller 750 can also include logic configured to receive signals for generating functional portions of a user interface for receiving or transmitting signals to effect input-output operations and functions. Note that elements depicted in diagram 700 may include structures and/or functions as similarly-named or similarly-numbered elements depicted in FIGS. 1, 2, and other figures.

Time parametric manager 712 is configured to identify time-related attributes and to generate time-related attribute data, such as data ("tc") 713a representing current time. Further, time parametric manager 712 is configured to identify time-related parameters, including time-related parameters associated with action items, and to generate time-related parametric data. For example, time-related parametric data ("t1") 713b and time-related parametric data ("t2") 713c can represent indications whether the current time coincides with a first event time frame and a second event time frame, respectively. For example, data 713b and 713c can indicate whether a store is open. In some cases, time parametric manager 712 is configured to receive time-related data from external sources, such as an electronic message 704, or from action alert repository 721.

Spatial parametric manager 714 is configured to identify spatial-related attributes and to generate spatial-related attribute data, such as data ("lc") 715a representing current location. Further, spatial parametric manager 714 is configured to identify spatial-related parameters, including spatial-related parameters associated with action items, such as locations at which action items are actionable, and to generate spatial-related parametric data. For example, spatial-related parametric data ("d1") 715b and spatial-related parametric data ("d2") 715c can represent data relative to a first destination and to a second destination, respectively. For example, data 715*b* and 715*c* can indicate locations (e.g., based on estimated or actual coordinates, such as GPS coordinates). Data 715*b* and 715*c* may also indicate relative distances from the current location to the respective destinations, or any other like spatial data. In some cases, spatial parametric manager 714 is configured to receive spatial-related data from external sources, such as an electronic message 704 or web-based data, or from action alert repository 721.

Figure 8:
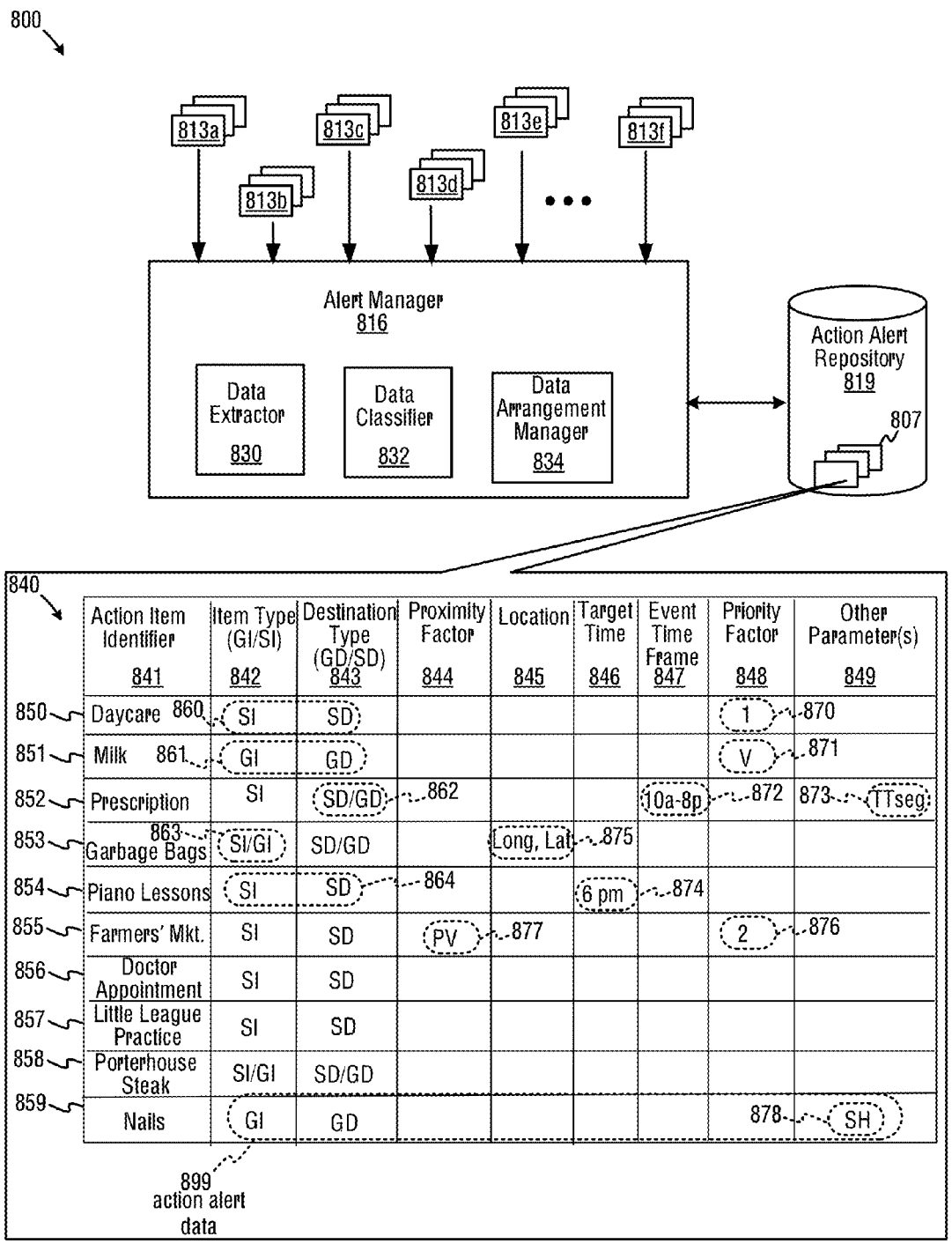
FIG. 8 is a diagram depicting an example of alert manager, according to some embodiments.

Alert manager 716 is configured to manage data arrangements that include one or more parameters or attributes for action items, whereby the data arrangements, at least in some cases, can be stored in action alert repository 721. Alert manager 716 can extract, capture, and generate data representing action items, such as action alert data ("AAD1") 717*a* and action alert data ("AAD2") 717*b*. Action alert data ("AAD1") 717*a* and action alert data ("AAD2") 717*b* may include a number of parameters and/or parametric values associated with an first action item and a second action item, respectively. Examples of parameters include, but are not limited to, a destination, an event time frame, an item type, a destination type, a priority factor, a proximity factor, and other parameters, some of which are depicted in FIG. 8 as is described below. Referring back to FIG. 7, alert manager 716 can also provide action alert data ("AAD1") 717*a* and action alert data ("AAD2") 717*b* to other components of action alert controller 710, including adapter alert controller 740.

Proximity threshold manager 718 is configured to generate one or more proximity threshold values, such as proximity threshold value ("PTV1") 719*a* and proximity threshold value ("PTV2") 719*b*. In some examples, proximity threshold value 719*a* and proximity threshold value 719*b* can be associated with the first action item and the second action item, respectively. Further, proximity threshold value 719*a* and proximity threshold value 719*b* can represent similar or different values. For example, one or more adaptive alerts can be determined for action items based on a common proximity threshold value 719*a*, or individual adaptive alerts can be determined for each action item based on a corresponding proximity threshold value, such as value 719*a* or 719*b*.

Diagram 700 includes an inset 780 that depicts an example of a technique to determine a proximity threshold value as a maximum distance ("Dmax") 786, according to at least one example. In this example, the proximity threshold value is determined as a value, if exceeded, likely causes a missed or late arrival at destination ("B") 790. To calculate the proximity threshold value, a difference (or delta) time ("tdel") interval is determined as an amount of time a user may use to traverse from original location ("D1") 782 via location at Dmax. Here, tdel may be determined by subtracting the initial time ("5:00 pm") from a target destination time ("7:00 pm") 787 to yield 2 hours. A predicted time ("Toth") 789 to traverse the other route(s) 788 or path segments(s) may be determined by computing a sum of (distances)/(rates of travel) for the path segments between, for example, location 784 to location 790. As such, the time it takes for traveling the path segments are added together to determine, for example, 1.5 hours travel time. Note that in some cases, Dmax can be initially set to destination D2 for computing Toth. Next, tdel-toth yields 0.5 hours, which is the tmax to travel Dmax 786 to arrive at B on time. To calculate Dmax, the product of tmax (e.g., 0.5 hr.) and a rate of travel (e.g., rate of traffic flow) may be used. For example, if this calculation results in Dmax being located at point 777 (e.g., e.g., at a proximity threshold value), then destination D2 exceeds it and the remaining time for traveling between point 777 and 784 will cause delays or missed appointments.

PTV adjuster 723 is configured to detect changes in attribute values or parametric values, including traffic flow, to reevaluate a proximity threshold value and, if necessary, recalculate the proximity threshold value. Returning to the above example in connection with inset 780, consider that the rate of travel/traffic increases significantly. Thus, the point 777 may coincide or surpass point 784, thereby indicating that destination D2 may fall under the recalculated proximity threshold value. As such, an adaptive alert to fulfill an action item at destination D2 may become enabled.

According to various embodiments, a proximity threshold value may also be determined as a function of one or more attribute values or parametric values or one or more "weighted" or "scaled" attribute values or parametric values to modify the PTV. For example, if a destination is beyond a proximity threshold value, an assigned priority (as a parameter) might be used to scale the proximity threshold value by a priority factor, which, in turn, may cause the destination to fall within the proximity threshold value.

Adaptive alert controller 740 may receive data from various other components, including proximity threshold values for a number of action items. As shown, alert controller 740 includes an adaptive alert analyzer 742, a destination selector 744, and an alert generator 746. Adaptive alert analyzer 742 is configured to determine whether parametric values, such as destination values of action items, fall under or beyond relative proximity threshold values. For those destination values that exceed the proximity threshold values, then adaptive alert analyzer 742 causes suppression of the corresponding adaptive alerts. By contrast, adaptive alert analyzer 742 enables generation of adaptive alerts for action items with destination values that are within boundaries set by proximity threshold values.

Destination selector 744 is configured to evaluate a variety of parametric values to determine which action items in the pool of valid action items (i.e., a pool of action items for which adaptive alerts are enabled) ought to the subject of the generation of adaptive alerts. For example, given a number of adaptive alerts, destination selector 744 may be configured to select those adaptive alerts having parametric values associated with higher priorities, specific item types (over generic item types), specific destination types (over generic destination types), and the like. As such, destination selector 744 performs, at least in some cases, as a prioritizer for the generation of valid adaptive alerts.

Alert generator 746 is configured to generate alerts for the adaptive alerts, and is further configured to format the alerts in any type of media (e.g., text, graphical or mapping forms, audio instructions, video, etc.). In some cases, the formatted alerts are transmitted to an interface controller 750, which, in turn, is configured to cause one or more portions of an adaptive alert to be presented on a touch-sensitive interface of a mobile computing device.

FIG. 8 is a diagram depicting an example of alert manager, according to some embodiments. Diagram 800 depicts an alert manager 816 including a data extractor 830, a data classifier 832, and a data arrangement manager 834, one or more of which cooperate to manage, extract and modify action alert data 807 stored in action alert repository 819, according to some embodiments. Data arrangement manager 834, at least in some examples, may be configured to add, delete, and/or modify the data stored in data arrangement

840. According to some examples, action alert data 807 can be configured into one or more data arrangements, such as data arrangement 840.

Data arrangement 840 includes a number of data records (e.g., from data record 850 to data record 859) that correspond to data representing, or otherwise associated with, a number of action items. A data record, such as data record 850 includes a number of parameters and/or attributes associated therewith. For example, a data record 850 includes an action item identifier 841 (e.g., "Daycare"), an item type 842 (e.g., indicating either a generic item, GI, or a specialized item, SI), a destination type 843 (e.g., indicating either a generic destination, GD, or a specialized destination, SD), a proximity factor 844, one or more locations 845 (e.g., stored as parametric data 875 specifying longitudinal and latitudinal coordinates), a target time 846, an event time frame 847, a priority factor 848, and other parameters 849.

Alert manager 816 is configured to identify the data of data arrangement 840, such as action alert data 899, that may be relevant to determine whether to generate an adaptive alert based on, for example, location data 845 and even time frame data 847. Data extractor 830 is configured to extract data from data arrangement 840 for use by an action alert controller in accordance with the various examples described herein. Further, data extractor 830 can be used to update data in data arrangement 840 based on, for example, data extracted as data 813*a* through data 813*f*.

Data 813*a* can represent data extracted or otherwise received from electronic messages, such as text messages. For example, if a pharmacy sends a text message to a phone number or any other identifier of mobile computing device, data extractor 830 can capture relevant information therein, such as an indication that a prescription has been filled and a time at which to pick up the prescription. From this information, alert manager 813 can either create or update data record 852 by adding, deleting or, or otherwise modifying associated parametric data. As another example, a family member may send a text message including data 813*a* requesting an action item to be fulfilled (e.g., pick up nails) when convenient for a parent or user of a mobile computing device that includes alert manager 816. Data extractor 830 can extract the data from the text message and cause data arrangement manager 834 to generate an action item associated with data record 859. Note that parameter value 878 in data record 859 indicates that the action item is shared or has been shared ("SH") by a family member or any other individual having access to data arrangement 840.

Data 813*b* can represent data extracted or otherwise received from data traffic or network traffic, such as from communications networks including the Internet. For example, data specifying particulars of the destination, such as the hours of operation and location of a store, can be used to establish parametric values for locations 845, event time frames 847, and others. In some cases, data 813*b* also includes map-related data and traffic flow-related data.

Data 813*c* can represent data extracted or otherwise received from a calendar application or system with which a user typically sets reminders on an electronic calendar. Therefore, in at least some examples, data arrangement manager 834 can use extracted calendar data from a calendar application to form action items based on action item records stored in data arrangement 840. Further, data 813*d* can represent data received from a phone application or manual user input, data 813*e* can represent data received from an email, and data 813*f* can represent other data received from other sources of data, such as parametric data.

Data classifier 832 may be configured to classify data, such as parametric data, to assist in formatting the data records in data arrangement 840. For example, data classifier 832 can classify for daycare data record 850 a corresponding item type 842 as a specialized item, or SI, and can further classify a corresponding destination type 843 as a generic item, or GI. Also, data classifier 832 can classify priority factor 848 is having a parametric value 870 of "1," which indicates that the daycare action item may not be superseded or otherwise deemphasized based on any other action items. This is because should another action item supersede the daycare action item, a child may be abandoned with no parent available to pick that child up.

As another example, data classifier 832 can be configured to classify milk, as an action item (e.g., data record 851) having a classified item type ("GI") 842 and a classified destination type ("GD") 843. In this example, pair 861 of generic item types and destination types indicates that any brand of milk may be purchased at any store. Note further that milk has priority factor ("V") 871 indicating "V" for variable, which may begin as a lower priority and begins increasing daily until a user has time to go to the grocery store. Further to classification of priorities, data classifier 832 may assign or classify (e.g., responsive to user input) less important action items, such as attending the farmer' market as a priority 876 of "2," which, if a conflict arose with the daycare action item (e.g., with priority 870 of "1"), would yield such that an adaptive alert is suppressed.

Further to classification of generic and specialized action items, data classifier 832 may assign destination type 862 as a "hybrid" destination type, whereby "SD/GD" indicates that while a prescription is specialized, or SI, the destination at which the prescription may be refilled can be specialized in some cases or at different locations of the same store (e.g., different Walmart™ locations). Also, data classifier 832 may assign item type 863 as a "hybrid" item type so that "SI/GI" indicates that a brand-name garbage bag is preferred in some cases, but in other cases a generic-brand may be sufficient. Note that data classifier 832 assists alert manager 816 determine which location is used for an adaptive alert based on "hybrid" item types. For example, if a specialized item is beyond a proximity threshold, but a generalized item is within the threshold, an adaptive alert may be generated for locations carrying the generalized item. As shown, data classifier 832 may assign a piano lesson action item (e.g., data record 854) as a pair 864 of specialized item type and destination type data indicators. Similar to daycare, a piano lesson with specific student with a specific teacher (i.e., a specialized item type) is available at specific location—the teacher's house (i.e., a specialized destination type).

Data classifier 832 may assign data 872 to event time frame 847 of data record 852 to indicate a time span in which an action item may be fulfilled, such as picking up a prescription between the hours of 10 am and 8 pm. Note that piano lessons have a required time at which to start, which data classifier 832 assigns a target time value 874 of "6 pm."

Data classifier 832 may assign data 877 as a proximity factor 844 value of "PV," which may be any value (e.g., a Proximity Value, or PV), such as a weighting or scaling factor that may be used to modify a value of a proximity threshold value to, for example, manually overriding generation or suppression of adaptive alerts for the farmers' market as an action item. Proximity factor 844 value may also dynamically change responsive to values of other proximity factor values changing in relation to other action items.

Data arrangement 840 may store data in other parameters 849, such as data ("TTseg") 873, which includes archive data. For example, as a user traverses over a route during a month's time, a value characterizing the "time to travel" over segment, TTseg, can be stored for purposes of calculating proximity threshold values in. Further, action alert repository 819 can store archived data for past action items in the event an action item is again requested or used (e.g., such as for reoccurring action items or tasks). As such, past parametric data of data arrangement 840 can facilitate expedited implementation of future action items.

Figure 9A:
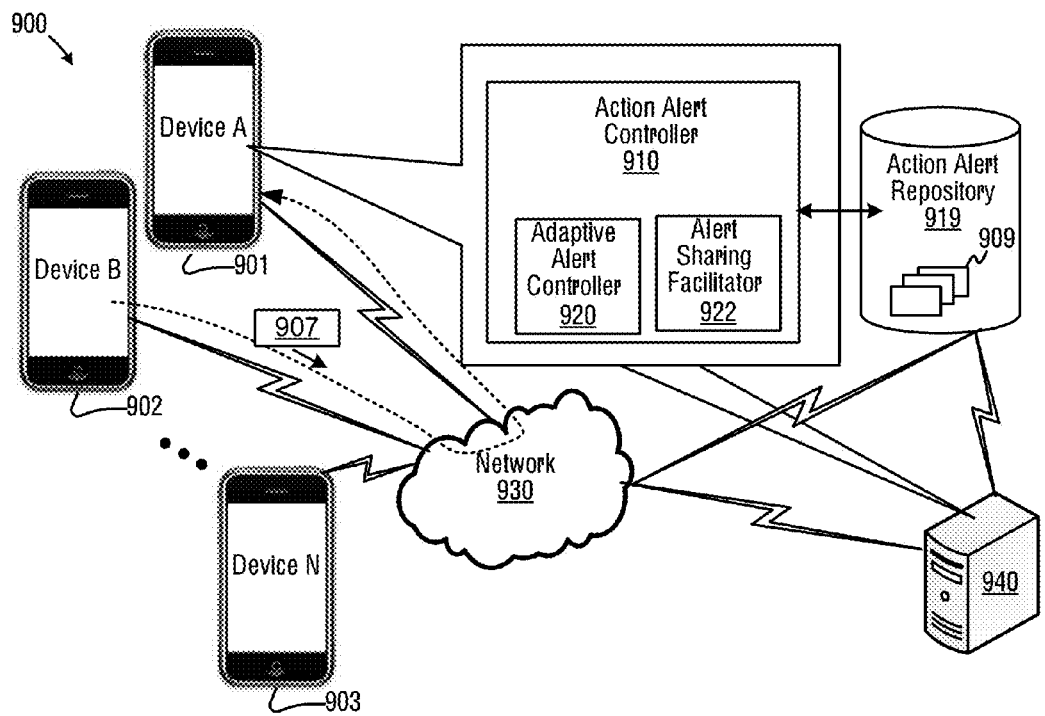
FIGS. 9A and 9B are diagrams depicting an action alert controller configured to share electronically adaptive alerts among a subset of user devices, according to some embodiments.
Figure 9B:
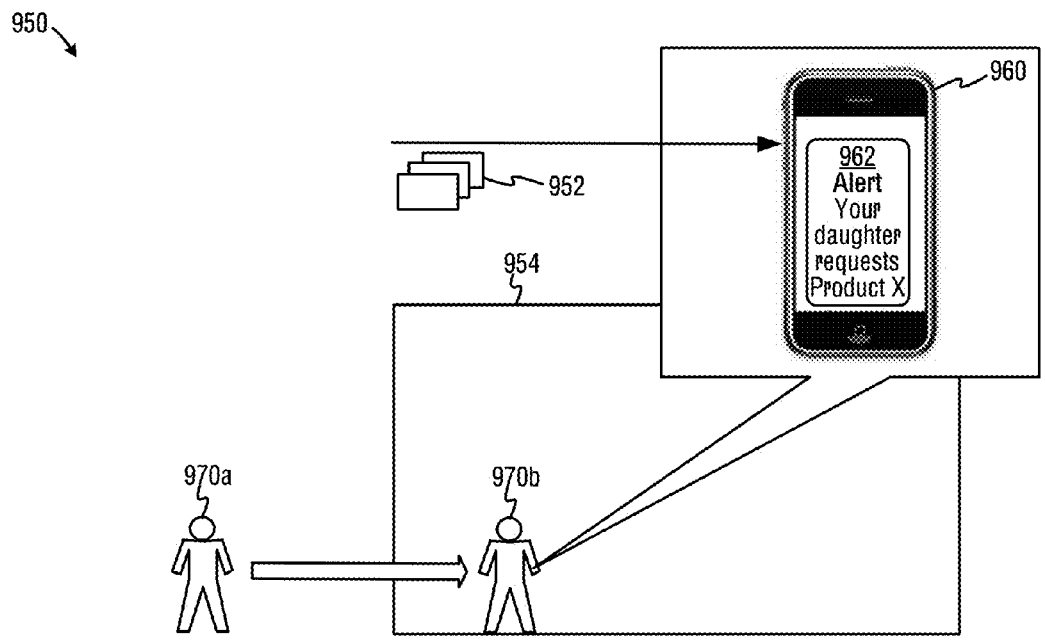

FIGS. 9A and 9B are diagrams depicting an action alert controller configured to share electronically adaptive alerts among a subset of user devices, according to some embodiments. Diagram 900 of FIG. 9A depicts a number of mobile computing devices, such as device ("A") 901, device ("B") 902, and device ("N") 903, one or more of which can implement one or more structures and/or functions as described herein. For example, action alert controller 910 can be disposed in device 901. In other examples, the functionality of action alert controller 910 can be distributed among various devices, including device 901 and remote networked server 940. In some cases, networked server 940 may include some or all portions of action alert controller 910. Diagram 900 also depicts an action alert repository 910 including action alert data 909 and one a more networks 930 configured to provide electronic communications link among devices shown in this example.

Action alert controller 910 includes an adaptive alert controller 920 and an alert sharing facilitator 922. Note that elements depicted in diagram 900 may include structures and/or functions as similarly-named or similarly-numbered elements depicted in one or more other figures. Alert sharing facilitator 922 may be configured to detect requests, such as via electronic message (e.g., a text message), to add an action item for generating an adaptive alert so that another device may facilitate fulfillment of the action item. For example, one family member associated with device 902 may send a text message 907 including a request to pick up a product from a store. Text message 907 is received into a device 901, which is associated with another family member. Alert sharing facilitator 922 detects text message 907 and identifies an action item as part of the request. Data associated with the requested action item may be extracted and provided to other components of action alert controller 910 to implement the requested action item as if it were that of the other family member.

Diagram 950 of FIG. 9B depicts the other family member 970a associated with a mobile computing device 960. In this example, family member 970a has a daughter that has transmitted electronic message 952 including a request to pick up a product X from a supermarket. Upon family member 970a entering a grocery store 954 as shopper 970b, action alert controller 910 of FIG. 9A can generate an adaptive alert triggered by a family member 970a being associated with a location (e.g., having GPS coordinates) at which a supermarket is located. As shown, family member 970a, which is now shopper 970b, may receive notification 962 to add an additional action item or product to a group of products being purchased at store 954.

Figure 10:
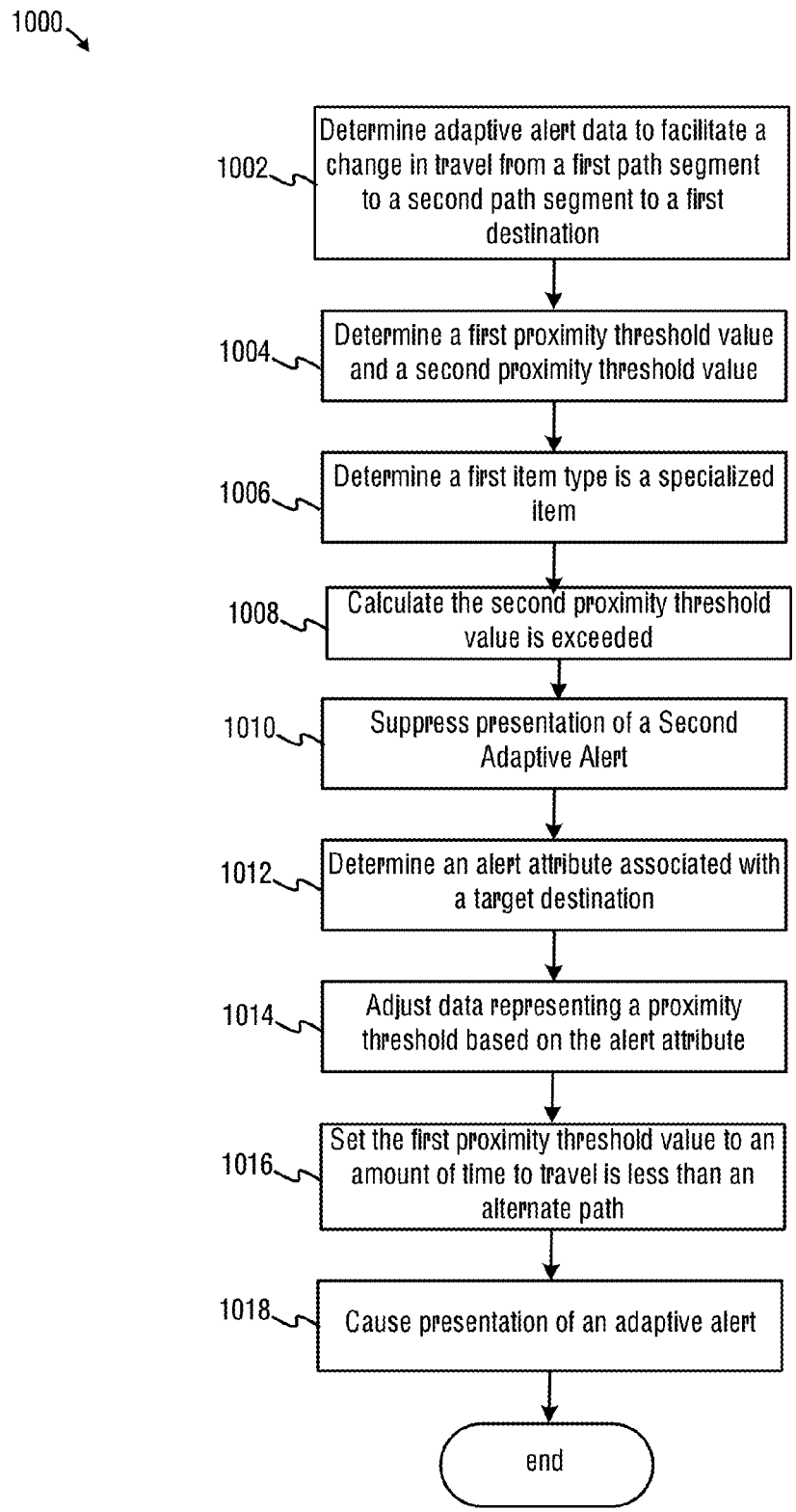
FIG. 10 is an example of a flow diagram to determine an action item for which an adaptive alert may be generated among multiple action items and/or adaptive alerts, according to some embodiments.

FIG. 10 is an example of a flow diagram to determine an action item for which an adaptive alert may be generated among multiple action items and/or adaptive alerts, according to some embodiments. At 1002, an adaptive alert data is determined that can facilitate a change in travel from a first path segment to a second path segment to a first destination at which a first action item may be fulfilled. Other action items may also have corresponding adaptive alert data specifying that the other action items may be, for example, enabled. At 1004, a first proximity threshold value for the first action item is determined. In some examples, a second proximity threshold value may also be determined for a second action item. But note that the second proximity threshold value may for the first action item in a variety of situations. For example, if the action item is associated with a generic (i.e., generalized item), then a product, such as milk, may be found a multiple stores at multiple locations. Hence, multiple proximity threshold values may be computed, according to some examples.

At 1006, a first item type is a specialized item for the first action item. In some cases, a specialized item may have a higher priority that might affect a magnitude of a proximity threshold value. For example, if a second action item corresponds to a generic item type, then the generic item type may, in some cases, be associated with a lower priority. For example, picking up a child at daycare, as a specialized item, likely supersedes picking up a gallon of milk, as a generic item, at a store.

At 1008, a second proximity threshold value is calculated and determined to be exceeded. For example, a destination for fulfilling a second action item may be too distant, given specific traffic conditions, or otherwise too inconvenient to both fulfill and subsequently arrive at another destination at a specific time. Thus, presentation of a second adaptive alert for the second action item may be suppressed at 1010.

An alert attribute, such as a mandatory arrival time, associated with a target destination can be determined at 1012. A proximity threshold value based on the alert attribute can be adjusted responsive to the value of the alert attribute. The first proximity threshold value can be set at 1016 to an amount of time to travel that, for example, is less than an alternate path or an alternate path segment. For example, travel along the alternate path or path segment may cause the mandatory arrival time to be missed. The alternate path or path segment, in some cases, may include a path or path segment to a destination that is too far (e.g., given traffic conditions) at which to fulfill an action item. Flow 1000 can cause presentation of an adaptive alert at 1018, thereby notifying a user of availability of an impending action item.

Figure 11:
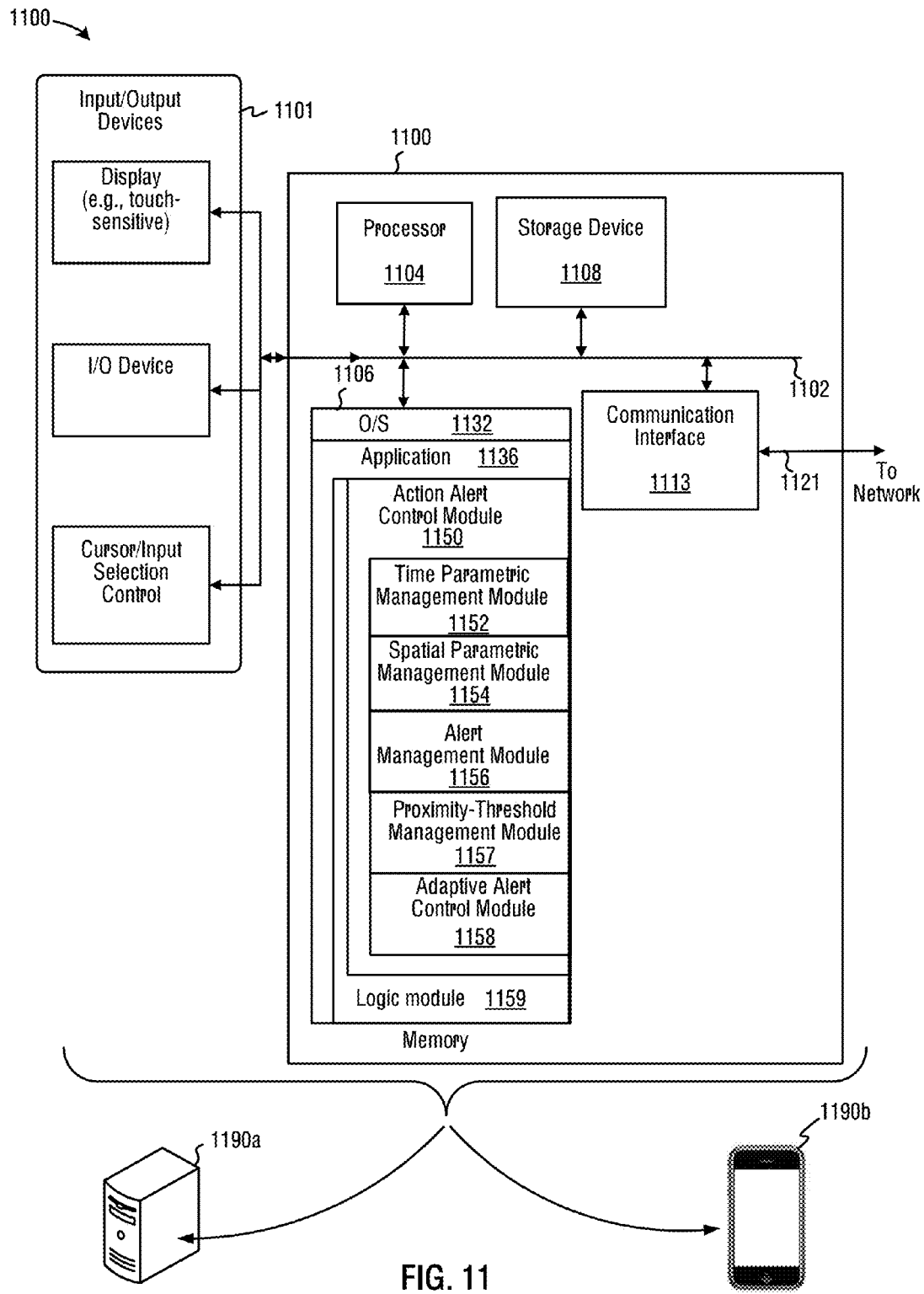
FIG. 11 illustrates an exemplary computing platform disposed in a device configured to facilitate changes in direction of travel based on implementation of adaptive alerts in accordance with various embodiments.

FIG. 11 illustrates an exemplary computing platform disposed in a device configured to facilitate changes in direction of travel based on implementation of adaptive alerts in accordance with various embodiments. In some examples, computing platform 1100 may be used to implement computer programs, applications, methods, processes, algorithms, or other software to perform the above-described techniques.

In some cases, computing platform can be disposed in wearable device or implement, a mobile computing device 1190b, or any other device, such as a computing device 1190a.

Computing platform 1100 includes a bus 1102 or other communication mechanism for communicating information, which interconnects subsystems and devices, such as processor 1104, system memory 1106 (e.g., RAM, etc.), storage device 1108 (e.g., ROM, etc.), a communication interface 1113 (e.g., an Ethernet or wireless controller, a Bluetooth controller, etc.) to facilitate communications via a port on communication link 1121 to communicate, for example, with a computing device, including mobile computing and/or or communication devices with processors. Processor 1104 can be implemented with one or more central processing units ("CPUs"), such as those manufactured by Intel® Corporation, or one or more virtual processors, as well as any combination of CPUs and virtual processors. Computing platform 1100 exchanges data representing inputs and outputs via input-and-output devices 1101, including, but not limited to, keyboards, mice, audio inputs (e.g., speech-to-text devices), user interfaces, displays, monitors, cursors, touch-sensitive displays, LCD or LED displays, and other I/O-related devices.

According to some examples, computing platform 1100 performs specific operations by processor 1104 executing one or more sequences of one or more instructions stored in system memory 1106, and computing platform 1100 can be implemented in a client-server arrangement, peer-to-peer arrangement, or as any mobile computing device, including smart phones and the like. Such instructions or data may be read into system memory 1106 from another computer readable medium, such as storage device 1108. In some examples, hard-wired circuitry may be used in place of or in combination with software instructions for implementation. Instructions may be embedded in software or firmware. The term "computer readable medium" refers to any tangible medium that participates in providing instructions to processor 1104 for execution. Such a medium may take many forms, including but not limited to, non-volatile media and volatile media. Non-volatile media includes, for example, optical or magnetic disks and the like. Volatile media includes dynamic memory, such as system memory 1106.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 1102 for transmitting a computer data signal.

In some examples, execution of the sequences of instructions may be performed by computing platform 1100. According to some examples, computing platform 1100 can be coupled by communication link 1121 (e.g., a wired network, such as LAN, PSTN, or any wireless network, including WiFi of various standards and protocols, Blue Tooth®, Zig-Bee, etc.) to any other processor to perform the sequence of instructions in coordination with (or asynchronous to) one another. Computing platform 1100 may transmit and receive messages, data, and instructions, including program code (e.g., application code) through communication link 1121 and communication interface 1113. Received program code may be executed by processor 1104 as it is received, and/or stored in memory 1106 or other non-volatile storage for later execution.

In the example shown, system memory 1106 can include various modules that include executable instructions to implement functionalities described herein. System memory 1106 may include an operating system ("O/S") 1132, as well as an application 1136 and/or logic module 1159. In the example shown, system memory 1106 includes an action alert control module 1150 including a time parametric management module 1152, a spatial parametric management module 1154, an alert management module 1156, a proximity-threshold management module 1157, and an adaptive alert control module 1158, one or more of which can be configured to provide or consume outputs to implement one or more functions described herein.

In at least some examples, the structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, an action alert controller or one or more of its components (or a proximity threshold manager and/or an adaptive alert controller), or any process or device described herein, can be in communication (e.g., wired or wirelessly) with a mobile device, such as a mobile phone or computing device, or can be disposed therein.

In some cases, a mobile device, or any networked computing device (not shown) in communication with an action alert controller or one or more of its components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figure can represent one or more algorithms. Or, at least one of the elements can represent a portion of logic including a portion of hardware configured to provide constituent structures and/or functionalities.

For example, an action alert controller or any of its one or more components, or any process or device described herein, can be implemented in one or more computing devices (i.e., any mobile computing device, such as a wearable device, an audio device (such as headphones or a headset) or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

For example, an action alert controller, including one or more components, or any process or device described herein, can be implemented in one or more computing devices that include one or more circuits. Thus, at least one of the elements in the above-described figures can represent one or more components of hardware. Or, at least one of the elements can represent a portion of logic including a portion of circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed:

1. A computer-implemented method implemented by a mobile computing device according to computer-executable instructions, the computer-implemented method comprising:
    displaying, on a display of the mobile computing device, a user interface enabling specification by a user of an action item that the user desires to complete;
    receiving, via the user interface, an indication of the action item, an action item location at which the action item is actionable, and an action item time frame during which the action item is actionable;
    receiving, via the user interface, a request for navigation instructions for travel to a destination, wherein the input specifies a desired arrival time frame in which the user desires to arrive at the destination;
    detecting a current location of the mobile computing device;
    obtaining an initial travel route directing the user from the current location to the destination, wherein the initial travel route is associated with an expected arrival time at which the user is expected to arrive at the destination under the initial travel route;
    determining an updated travel route, the updated travel route deviating from the initial travel route and directing the user to the action item location and subsequently to the destination, wherein the updated travel route is associated with an expected arrival time at which the user is expected to arrive at the action item location under the updated travel route and a revised expected arrival time at which the user is expected to arrive at the destination under the updated travel route;
    verifying that the expected arrival time at the action item location falls within the action item time frame and that the revised expected arrival time at the destination falls within the desired arrival time frame; and
    displaying, within the user interface, an alert to facilitate a change in travel from the initial travel route to the updated travel route.

2. The computer-implemented method of claim 1, wherein displaying the alert comprises displaying the updated travel route.

3. The computer-implemented method of claim 1, wherein the action item is a first action item, wherein the action item location is a first action item location, and wherein the computer-implemented method further comprises:
    receiving, via the user interface, an indication of a second action item, a second action item location associated with the second action item, and a second action item time frame during which the second action item is actionable; and
    determining a second updated travel route, the second updated travel route deviating from the initial travel route and directing the user to the second action item location and subsequently to the destination, wherein the second updated travel route indicates an expected arrival time at which the user is expected to arrive at the second action item location under the second updated travel route and a second revised expected arrival time at which the user is expected to arrive at the destination under the second updated travel route.

4. The computer-implemented method of claim 3, wherein the second updated travel route directs the user to both the first action item location and the second action item location.

5. The computer-implemented method of claim 3, further comprising:
    determining that the expected arrival time at the second action item location does not fall within the second action item event time frame, that the second revised expected arrival time at the destination does not fall within the desired arrival time frame, or both; and
    declining to display a second alert to facilitate a change in travel to the second updated travel route.

6. The computer-implemented method of claim 3, further comprising:
    verifying that the expected arrival time at the second action item location falls within the second action item time frame and that the second revised expected arrival time at the destination falls within the desired arrival time frame; and
    displaying, within the user interface, a second alert to facilitate a change in travel to the second updated travel route.

7. The computer-implemented method of claim 3, further comprising:
   determining a categorization for the first action item, the categorization for the first action item identifying the first action item as a specialized action item based at least partly on determining that the action item location is an individual location;
   determining a categorization for the second action item, the categorization for the second action item identifying the second action item as a generic action item based at least partly on determining that the second action item location includes a plurality of locations; and
   determining that the first action item should be prioritized over the second action item based at least in part on the categorizations of the first and second action items.

8. The computer-implemented method of claim 3, further comprising:
   determining a categorization for the first action item, the categorization for the first action item identifying the first action type as a specialized-generic action item that is a specialized action item during the action item time frame and is a generic item outside the action item time frame;
   determining the expected arrival time at the action item location is during the action item time frame; and
   determining that the first action item should be prioritized over the second action item based at least in part on the categorization of the first action item.

9. The computer-implemented method of claim 3, further comprising:
   determining a priority for the first action item;
   determining a priority for the second action item; and
   determining that the first action item should be prioritized over the second action item based at least in part on the respective priorities of the first and second action items.

10. Non-transitory computer readable media comprising executable instructions that, when executed by a computing system, cause the computing system to:
    receive, via a user interface displayed on a display of a mobile computing device, an indication of the action item, an action item location at which the action item is actionable, and an action item time frame during which the action item is actionable;
    receive, via the user interface, a request to navigate to a destination, wherein the request specifies a desired arrival time frame in which the user desires to arrive at the destination;
    detect a current location of the mobile computing device;
    determine a travel route directing the user from the current location to the action item location and subsequently to the destination, wherein the travel route is associated with an expected arrival time at which the user is expected to arrive at the action item location under the travel route and an expected arrival time at which the user is expected to arrive at the destination under the travel route;
    verify that the expected arrival time at the action item location falls within the action item time frame and that the expected arrival time at the destination falls within the desired arrival time frame; and
    transmit to the mobile computing device information causing display, on the mobile computing device, of an alert to facilitate travel on the travel route.

11. The non-transitory computer readable media of claim 10, wherein the travel route is an updated travel route, and wherein the executable instruction further cause the computing system to:
    determine an initial travel route directing the user from the current location to the destination; and
    determine the updated travel route as a potential deviation from the initial travel route.

12. The non-transitory computer readable media of claim 10, wherein the action item is one of a plurality of action items, and wherein the executable instructions further cause the computing system to select the action item from among the plurality of action items as potentially accomplishable during navigation to the destination.

13. A mobile computing device comprising:
    a memory including information identifying an action item specified by a user of the mobile computing device, the information further identifying an action item location at which the action item is actionable and an action item time frame at which the action item is actionable;
    a display;
    a processor in communication with the memory and the display, the processor configured with computer-executable instructions to:
    output on the display a user interface enabling input of a request to navigate to a destination;
    obtain, via the user interface, the request to navigate to the destination, wherein the request specifies a desired arrival time frame in which the user desires to arrive at the destination;
    detect a current location of the mobile computing device;
    determine a travel route directing the user from the current location to the action item location and subsequently to the destination, wherein the travel route is associated with an expected arrival time, at which the user is expected to arrive at the action item location under the travel route, that falls within the action item time frame and an expected arrival time, at which the user is expected to arrive at the destination under the travel route, that falls within the desired arrival time frame; and
    output a notification indicating that navigation via the travel route can be used to accomplish the action item.

14. The mobile computing device of claim 13, wherein the processor is further configured with the computer-executable instructions to verify that the expected arrival time at the action item location falls within the action item time frame and that the expected arrival time at the destination that falls within the desired arrival time frame.

15. The mobile computing device of claim 13, wherein the travel route is an updated travel route, and wherein the processor is further configured with the computer-executable instructions to:
    determine an initial travel route directing the user from the current location to the destination; and
    identify the updated travel route as a potential deviation from the initial travel route.

16. The mobile computing device of claim 15, wherein the action item is one of a plurality of action items identified by the information included in the memory, and wherein the processor is further configured with the computer-executable instructions to select the action item from among the plurality of action items as potentially accomplishable during navigation to the destination.

17. The mobile computing device of claim 16, wherein the processor is configured with the computer-executable instructions to select the action item from among the plurality of action items as potentially accomplishable during navigation to the destination at least in part by determining which action items, of the plurality of action items, are associated with an action item location includable within a valid travel route of the user from the current location to the destination, wherein travel routes are considered valid if implementation of the travel route is expected to result in arrival of the user at the destination within the desired arrival time frame.

18. The mobile computing device of claim 16, wherein the processor is configured with the computer-executable instructions to select the action item from among the plurality of action items as potentially accomplishable during navigation to the destination based at least in part on ranking the plurality of action items according to at least a priority of respective action items within the plurality of action items.

19. The mobile computing device of claim 16, wherein the processor is configured with the computer-executable instructions to select the action item from among the plurality of action items as potentially accomplishable during navigation to the destination based at least in part on ranking the plurality of action items according to at least a categorization of respective action items within the plurality of action items.

20. The non-transitory computer readable media of claim 19, wherein the executable instructions cause the computing system to select the action item from among the plurality of action items as potentially accomplishable during navigation to the destination at least in part by determining which action items, of the plurality of action items, are associated with an action item location includable within a valid travel route of the user from the current location to the destination, wherein travel routes are considered valid if implementation of the travel route is expected to result in arrival of the user at the destination within the desired arrival time frame.

21. The non-transitory computer readable media of claim 19, wherein the executable instructions cause the computing system to select the action item from among the plurality of action items as potentially accomplishable during navigation to the destination based at least in part on ranking the plurality of action items according to at least one of a priority of respective action items within the plurality of action items or a categorization of respective action items within the plurality of action items.

\* \* \* \* \*

UNITED STATES PATENT AND TRADEMARK OFFICE
CERTIFICATE OF CORRECTION

PATENT NO. : 9,557,185 B2  
APPLICATION NO. : 14/539970  
DATED : January 31, 2017  
INVENTOR(S) : Juliette Susan Kimes Page 1 of 1

It is certified that error appears in the above-identified patent and that said Letters Patent is hereby corrected as shown below:

In the Claims

In Column 26 at Lines 4-5, Change "of claim 19," to --of claim 12,--.

In Column 26 at Lines 16-17, Change "of claim 19," to --of claim 12,--.

Signed and Sealed this  
Twenty-ninth Day of August, 2017

Joseph Matal  
*Performing the Functions and Duties of the*  
*Under Secretary of Commerce for Intellectual Property and*  
*Director of the United States Patent and Trademark Office*